US007226358B2

(12) United States Patent
Miller et al.

(10) Patent No.: US 7,226,358 B2
(45) Date of Patent: Jun. 5, 2007

(54) METHOD, APPARATUS AND SYSTEM FOR GAMING USING A ROTATABLE PAYOUT INDICATOR

(75) Inventors: Charles R. Miller, Henderson, NV (US); Brian A. Johnson, Las Vegas, NV (US); James R. Stanek, Henderson, NV (US); Canyon Deville, Henderson, NV (US); Michael MacVittie, Las Vegas, NV (US); William R. Adams, Las Vegas, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/411,765

(22) Filed: Apr. 10, 2003

(65) Prior Publication Data

US 2004/0009807 A1 Jan. 15, 2004

Related U.S. Application Data

(63) Continuation of application No. 09/966,333, filed on Sep. 27, 2001, now abandoned.

(51) Int. Cl.
*G07F 17/34* (2006.01)
*A63F 13/00* (2006.01)
*A63F 13/08* (2006.01)

(52) U.S. Cl. ............................ 463/20; 463/22; 463/25; 463/32; 463/46; 273/143 R; 273/138.2

(58) Field of Classification Search ............ 273/143 R, 273/138.1, 138.2, 100–149; 463/1–49
See application file for complete search history.

(56) References Cited

U.S. PATENT DOCUMENTS 4,149,728 A 4/1979 Thompson .................. 273/274
4,732,386 A 3/1988 Rayfiel .................. 273/142 H
4,871,171 A 10/1989 Rivero .................. 273/138 A
4,906,005 A 3/1990 Manabe .................. 273/142 R (Continued)

FOREIGN PATENT DOCUMENTS

ES 2016168 10/1990

(Continued)

OTHER PUBLICATIONS

Monster Match, A.C. Coin & Slot Co., Stricty Slots magazine, Jan. 2002, p. 37.*

(Continued)

*Primary Examiner*—Benjamin Layno
(74) *Attorney, Agent, or Firm*—Marshall, Gerstein & Borun LLP

(57) ABSTRACT

Gaming devices comprising a gaming unit configured for play of a primary game and a bonus game. The bonus game portion of the gaming unit includes at least a outcome display element with an associated, cooperative outcome indicator element. The outcome display element may be rotatable about a substantially upright axis and comprise a sphere, a gem or other suitable element for displaying potential game outcomes for the bonus game, the game outcome being indicated by a portion of the outcome display element aligned with the outcome indicator element upon cessation of rotation of the former. Employing visually perceptible representations of rotation of the outcome display element rather than physical rotation thereof is also disclosed.

20 Claims, 17 Drawing Sheets

U.S. PATENT DOCUMENTS

| | | | | |
|---|---|---|---|---|
| 5,102,135 | A | 4/1992 | Addiechi | 273/142 E |
| 5,184,821 | A | 2/1993 | Korenek | 273/138 A |
| 5,188,363 | A | 2/1993 | Marnell, II et al. | 273/85 CP |
| 5,259,616 | A | 11/1993 | Bergmann | 273/138 A |
| 5,292,127 | A | 3/1994 | Kelly et al. | 273/138 R |
| 5,344,145 | A | 9/1994 | Chadwick et al. | 273/138 A |
| 5,362,052 | A | 11/1994 | Kubatsch | 273/145 R |
| 5,486,005 | A | 1/1996 | Neal | 273/292 |
| 5,513,846 | A | 5/1996 | Nierderlien et al. | 273/143 R |
| 5,553,851 | A | 9/1996 | Malavazos et al. | 273/142 E |
| 5,584,763 | A | 12/1996 | Kelly et al. | 463/16 |
| 5,653,636 | A * | 8/1997 | Takemoto et al. | 463/20 |
| 5,722,891 | A * | 3/1998 | Inoue | 463/20 |
| 5,788,573 | A | 8/1998 | Baerlocher et al. | 463/16 |
| 5,823,874 | A | 10/1998 | Adams | 463/17 |
| 5,848,932 | A | 12/1998 | Adams | 463/20 |
| 5,882,261 | A | 3/1999 | Adams | 463/20 |
| 5,911,418 | A | 6/1999 | Adams | 273/274 |
| 5,947,820 | A | 9/1999 | Morro et al. | 463/9 |
| 6,004,207 | A | 12/1999 | Wilson, Jr. et al. | 463/20 |
| 6,059,658 | A | 5/2000 | Mangano et al. | 463/16 |
| 6,089,978 | A | 7/2000 | Adams | 463/20 |
| 6,105,962 | A | 8/2000 | Malavazos et al. | 273/143 R |
| 6,120,377 | A | 9/2000 | McGinnis, Sr. et al. | 463/20 |
| 6,173,955 | B1 | 1/2001 | Perrie et al. | 273/146 |
| 6,224,483 | B1 | 5/2001 | Mayeroff | 463/20 |
| 6,302,791 | B1 * | 10/2001 | Frohm et al. | 463/21 |
| 6,334,814 | B1 | 1/2002 | Adams | 463/20 |
| 6,336,863 | B1 | 1/2002 | Baerlocher et al. | 463/27 |
| 6,398,220 | B1 | 6/2002 | Inoue | 273/142 R |
| 6,491,296 | B2 | 12/2002 | Kelly et al. | 273/118 A |
| 6,598,877 | B1 | 7/2003 | Luciano et al. | 273/142 R |
| 6,663,488 | B1 | 12/2003 | Adams | 463/17 |
| 2001/0003709 | A1 | 6/2001 | Adams | 463/20 |
| 2001/0034259 | A1 | 10/2001 | Luciano et al. | 463/16 |
| 2001/0054794 | A1 | 12/2001 | Cole et al. | 273/138.1 |
| 2002/0086728 | A1 * | 7/2002 | Bennett et al. | 463/25 |

FOREIGN PATENT DOCUMENTS

| | | |
|---|---|---|
| ES | 2047436 | 2/1994 |
| ES | 2047437 | 2/1994 |
| GB | 2170636 | 6/1986 |
| GB | 2201821 | 9/1988 |
| GB | 2202984 | 10/1988 |
| GB | 2268415 | 1/1994 |
| GB | 2356353 | 5/2001 |
| JP | 5-131044 | 5/1993 |
| JP | 5-131045 | 5/1993 |
| JP | 5-131046 | 5/1993 |
| JP | 6-2177 | 1/1994 |
| JP | 6-254208 | 9/1994 |
| WO | WO 01/14030 | 3/2001 |

OTHER PUBLICATIONS

Miss America, A.C. Coin & Slot Co.*

Mix and Match Series, A.C. Coin & Slot Co., Stricty Slots magazine, Apr. 2002, p. 60-62.*

Silver City Roundup, A.C. Coin & Slot Co.*

Bally Circus: Document describing 1972 “Circus” game, ANCHOR 15706.

Bally Circus: Document showing 1972 “Circus” game.

European Search Report dated Aug. 31, 2004 for EPO Appl. No. 02021907.7, which is the EPO counterpart of the present application, 5 pages.

“Communication Pursuant to Article 96(2) EPC,” dated Apr. 20, 2005 and issued by the EPO in connection with EPO Appl. No. 02021907.7, which is the EPO counterpart of the present application, 6 pages.

* cited by examiner

METHOD, APPARATUS AND SYSTEM FOR GAMING USING A ROTATABLE PAYOUT INDICATOR

This patent is a continuation of U.S. Ser. No. 09/966,333 filed Sep. 27, 2001, now abandoned, which is incorporated by reference herein in its entirety.

BACKGROUND OF THE INVENTION

The present invention is directed to novel gaming devices and, more particularly, to gaming devices comprising at least primary and secondary events capable of providing at least one of a plurality of payouts. More specifically, the present invention relates to gaming methods, devices and systems employing a rotating sphere or other element to display an outcome of a game of chance.

Games of chance have been enjoyed by people for years and have enjoyed widespread popularity in recent times. Many people enjoy playing a wide variety of games that they have not played before. Playing new games adds to the excitement of this recreational activity particularly when some form of "gaming" is involved. As used herein, the terms "gaming" and "gaming devices" are used to indicate that some form of wagering is involved, and that players must make wagers of value, whether actual currency or some equivalent of value, e.g., token or credit.

One popular game of chance that has long been enjoyed by many players is the slot machine. Conventionally, a slot machine is configured for a player to input something of value, e.g., a standard denomination of currency or house token or other representation of currency or credit, and then to permit the player to activate the device, which causes a plurality of reels to spin and ultimately stop to display a random combination of some form of indicia, for example, numbers or symbols. If this display contains one of a preselected plurality of winning combinations, the machine releases money into a payout chute or onto a credit meter for the player. For example, if a player initially wagered two coins of a national currency and that player won a high payout, that player may receive fifty coins of the same denomination in return.

Electronic games and their methods and apparatus for use are well-known in the art. Electronic games include games of chance, games of skill, and games involving both skill and chance. Examples of patents describing various games of chance include U.S. Pat. No. 5,833,536 to Davids et al. (Nov. 10, 1998), U.S. Pat. No. 5,769,716 to Saffari et al. (Jun. 23, 1998), U.S. Pat. No. 5,820,460 to Fulton (Oct. 13, 1998) and U.S. Pat. No. 5,947,820 to Morro et al. (Sep. 7, 1999).

Electronic games may also be coupled to one or more other computers such as a central controller of a casino, e.g., via a network card and link, modem and the like. The game parameters, such as how, when and where particular images will appear on the display screen, how the game works and how to operate the various elements operably coupled to the computer, are stored in the memory. Often, the electronic gaming device may be housed in a structural and/or decorative housing as is well-known and understood by those of ordinary skill in the art.

As noted above, initiating an electronic game can be done as simply as by inserting a coin, token, or other type of currency. Another more comprehensive example of initiating a game includes inserting an identification card, such as a "smart card" having a programmed microchip or a magnetic strip coded with a player's identification, credit totals and other relevant information. See U.S. Pat. No. 5,265,874 to Dickinson et al. (Nov. 30, 1993), the disclosure of which is hereby incorporated by reference herein. It is also known to use a writeable identification card, such as a smart card to eliminate the need for a network or direct connection between remote systems and a common controller or point database such as is described in U.S. Pat. No. 5,806,045 to Biorge et al. (Sep. 8, 1998). Promotional point and credit information may be retrieved, recorded and updated using the smart card. Additionally, it is known to transfer money to a game through an electronic funds transfer as described in U.S. Pat. No. 5,902,983 to Crevelt et al. (May 11, 1999).

Existing electronic game displays typically include multiple images representing various aspects of a game such as a game portion, a credit total portion and a wager amount portion. Other electronic game displays include an additional bonus award portion to indicate an amount of a bonus award which may be won, typically through multiple or secondary games. See U.S. Pat. No. 5,851,148 to Brune et al. (Dec. 22, 1998) and U.S. Pat. No. 5,911,418 to Adams (Jun. 15, 1999).

Bonus gaming, also known in the art, includes employing a secondary game, often a different type of game than that of the primary game, as an additional activity for a player of the primary game. Implementation of a bonus game includes providing a game of chance, such as, for example, one like that described above, as a first or a primary gaming unit. Another gaming unit is then provided as a secondary, bonus game which is typically accessible upon receipt of a winning hand (in the case of a card game) or the occurrence of a specified symbol, icon, or indicia or one or more specific combinations of same during play of the primary gaming unit. Often the existence of a bonus game serves to attract a player through the perception of having increased opportunity to win during the player's gaming activities. The display associated with the bonus game is separate and distinct from the display associated with the primary gaming unit. Exemplary gaming machines which offer not only a primary gaming unit but secondary games of various types are disclosed in U.S. Pat. Nos. 5,823,874 and 5,848,932 to Adams, assigned to the assignee of the present invention.

Bonus gaming may also be conducted through a plurality of networked games such that the secondary gaming activity might involve a plurality of individuals who have been wagering at primary gaming units. Some examples of bonus gaming include U.S. Pat. No. 5,779,544 (Jul. 14, 1998), U.S. Pat. No. 5,664,998 (Sep. 9, 1997) and U.S. Pat. No. 5,560,603 (Oct. 1, 1996) all to Seelig et al. More particularly, some examples of bonus gaming including a plurality of networked primary gaming machines include U.S. Pat. No. 6,146,273 to Olsen (Nov. 14, 2000), U.S. Pat. No. 6,012,982 to Piechowiak et al. (Jan. 11, 2000), and U.S. Pat. No. 5,876,284 to Acres et al. (Mar. 2, 1999).

As noted above, bonus games serve to entice the player to wager at a particular primary game with the hope of being rewarded through the potential of increased winnings. One of the entertaining features of bonus games, such as the notably successful "WHEEL OF FORTUNE" networked bonus games offered in casinos throughout a particular state, for example Nevada, is the visual aspect of the rotating, brightly lit bonus wheel signaling the potential for a large, even multi-million dollar payout from a bonus game win funded by wagers placed on all of the participating, networked gaming machines. Further, those familiar with games involving winning payouts, such as the popular television game show entitled "WHEEL OF FORTUNE," will realize that as players and observers watch a large wheel spin and gradually come to rest, the players experience a heightened feeling of anticipation and excitement as the wheel is slowing down to indicate a possible prize.

The use of bonus games has been beneficial in the initial attraction of players to a primary gaming machine and the placement of a wager for play of the primary game. However, there is potential for further improvement in the manner in which the secondary or bonus game operation and outcome may be visibly displayed as well as in how the secondary or bonus game itself may be characterized or "themed."

BRIEF SUMMARY OF THE INVENTION

Various embodiments of the present invention comprise methods of playing games, gaming devices and table games utilizing a primary game, e.g., rotatable reels, and at least one discernible indicia of a secondary game, preferably comprising a payout indicator. The secondary game is separate from the primary game either physically or temporally.

According to the most preferred embodiments, a bonus payout indicator is clearly visible to a player and is operable when primary reels of a primary game slot machine stop on certain predetermined indicia. According to one preferred embodiment of the present invention, a secondary payout indicator is in the form of a rotatable bonus wheel which can be caused to spin automatically or in response to some action by a player, e.g., the player pushing a button, when the primary game indicates one of a predetermined plurality of indicia. The wheel is caused to gradually reduce speed and, when the wheel stops, a pointer indicates the payout to be awarded to the player.

Another preferred embodiment of the present invention further comprises a discernible multiplier which provides the ability to change the payout from either the primary gaming unit or the secondary payout indicator, or both. As described in more detail below, it is within the scope of the present invention to provide a payout from the primary gaming unit, a payout indicated by the secondary indicator only, a payout from the primary gaming unit or the secondary indicator as changed by the multiplier, or a separate plurality of payouts from the primary gaming unit and the secondary indicator either with or without modification by a multiplier.

According to one preferred embodiment of the present invention, the mechanical bonus payout indicator is electronically operated and is linked to a random number generator which determines where the secondary indicator actually stops.

According to another preferred embodiment of the present invention, when the primary unit stops on one of a predetermined plurality of winning indicia sets, a second event actuator is placed in an active state. According to this embodiment, a person, such as the player, must actuate the actuator in order to operate the bonus indicator.

According to another embodiment of the present invention, the bonus actuator requires operator intervention so that a player must involve a casino attendant who can activate the bonus indicator.

According to another preferred embodiment of the present invention, the bonus indicator is connected to a drive mechanism which gradually reduces the rate of spin of the bonus wheel before the bonus wheel stops.

Still other embodiments of the present invention comprise gaming devices having electronic means for displaying indicia of rotatable reels such as a video screen and/or means for displaying indicia of a secondary payout indicator, such as a video screen. The present invention also comprises methods for playing a game of chance. One preferred method comprises the steps of displaying a first randomly selected combination of indicia, the displayed indicia selected from the group consisting of slot reels, indicia of at least one reel, indicia of at least one playing card, and combinations thereof; generating at least one signal corresponding to at least one select display of first indicia; and providing at least one discernible indicia of a mechanical bonus indicator, the bonus indicator indicia indicating at least one of a plurality of possible payouts, wherein the bonus indicator indicia-providing means is operatively connected to a first, standard gaming unit and actuatable in response to said signal. According to one preferred embodiment, the discernible indicia of a mechanical bonus indicator gradually reduces the rate of movement of the mechanical bonus indicator for some period of time prior to actually providing the discernible indicia of a payout. According to another embodiment, a multiplier is provided to multiply at least one payout by a multiple which is most preferably indicated to a player. The multiple can preferably sequentially change as discernible indicia change. For example, a plurality of multiples can be synchronized with a plurality of discernible indicia on the mechanical bonus indicator such that the multiple changes as the payout indicated changes.

Further embodiments of the present invention comprise a method of conducting a game of chance comprising the steps of providing a player with an opportunity to place a wager; displaying a randomly selected combination of indicia, the displayed indicia selected from the group consisting of reels, indicia of at least one and preferably a plurality of reels, indicia of at least one and preferably a plurality of playing cards, and combinations thereof; generating at least one signal corresponding to at least one select display of the indicia; providing at least one discernible indicia of a mechanical bonus indicator, the bonus indicator indicia indicating at least one of a plurality of possible bonuses, wherein the bonus indicator indicia is in the form of a wheel or reel and is actuatable in response to the signal.

Other embodiments provide methods and gaming devices wherein a secondary gaming unit selects and displays a secondary indicia and the winning award to a player is the product of the amount wagered by the player and the secondary indicia.

In a further embodiment of the present invention, a game outcome display element rotatable about a substantially upright axis is employed to display or simulate the operation of a game of chance and is further employed to display the outcome of the game. This embodiment is especially suitable for use in bonus games, but is not so limited.

In such an embodiment of the present invention, a rotatable outcome display element is oriented for rotation about a substantially upright axis to indicate a payout at cessation of rotation by alignment with an outcome indicator element. As used herein in its broadest sense, the term "upright" includes and encompasses not only a vertical orientation but also an orientation at any acute angle to the vertical. As with the preceding embodiments, the outcome of the game may be determined through the use of a random number generator, as known in the art, prior to initiation of rotation of the outcome display element. A drive assembly, such as, for example, a stepper motor and driver may be used to power rotation of the outcome display element, the driver being used to control the relative locations of mutually adjacent, circumferentially spaced regions of the outcome display element, each region being indicative of a potential game outcome, and stopping rotation of the outcome display element with a region selected by the random number generator aligned with the outcome indicator element to indicate the outcome of the game and associated payout.

In some exemplary implementations of this embodiment of the present invention, the outcome display element may be configured as a sphere positioned to rotate about a substantially upright axis extending substantially through its diameter. The sphere may be circumferentially segmented into a plurality of mutually adjacent sectors which may be characterized as resembling slices of an orange, each sector having associated therewith and displaying a potential game outcome of a plurality of outcomes represented by the number of sectors of the sphere. The axis of rotation of the sphere may be substantially vertical, or inclined at an acute angle to the vertical. As the sphere rotates, each sector passes by, through or under an outcome indicator element, the game outcome being established by the sector finally aligned with the outcome indicator element when rotation of the sphere ceases.

In another exemplary implementation of this embodiment of the present invention, the outcome display element may be configured as an upright gem, for example a diamond, positioned to rotate about a substantially upright, central longitudinal axis. The diamond or other gem may be circumferentially segmented into a plurality of mutually adjacent facets as would be apparent on the exterior of an actual diamond or other gem, each facet having associated therewith, and displaying, a potential game outcome of a plurality of outcomes represented by the number of facets of the diamond. The axis of rotation of the diamond may be substantially vertical, or inclined at an acute angle to the vertical. As the diamond rotates, each facet passes by, through or under an outcome indicator element, the game outcome being established by the facet finally aligned with the outcome indicator element when rotation of the diamond ceases.

Other and further configurations for outcome display elements oriented for rotation about a substantially upright axis are contemplated and encompassed by the present invention, as are games of chance employing such outcome display elements.

As used herein, the term "game of chance" includes and encompasses not only games having a random or arbitrary outcome, but also such games which also invite or require some player input to the game having at least a potential for affecting a game outcome. Such player input is generally termed "skill" whether or not such input is in actuality beneficial in terms of game outcome.

DETAILED DESCRIPTION OF THE INVENTION

Figure 1:
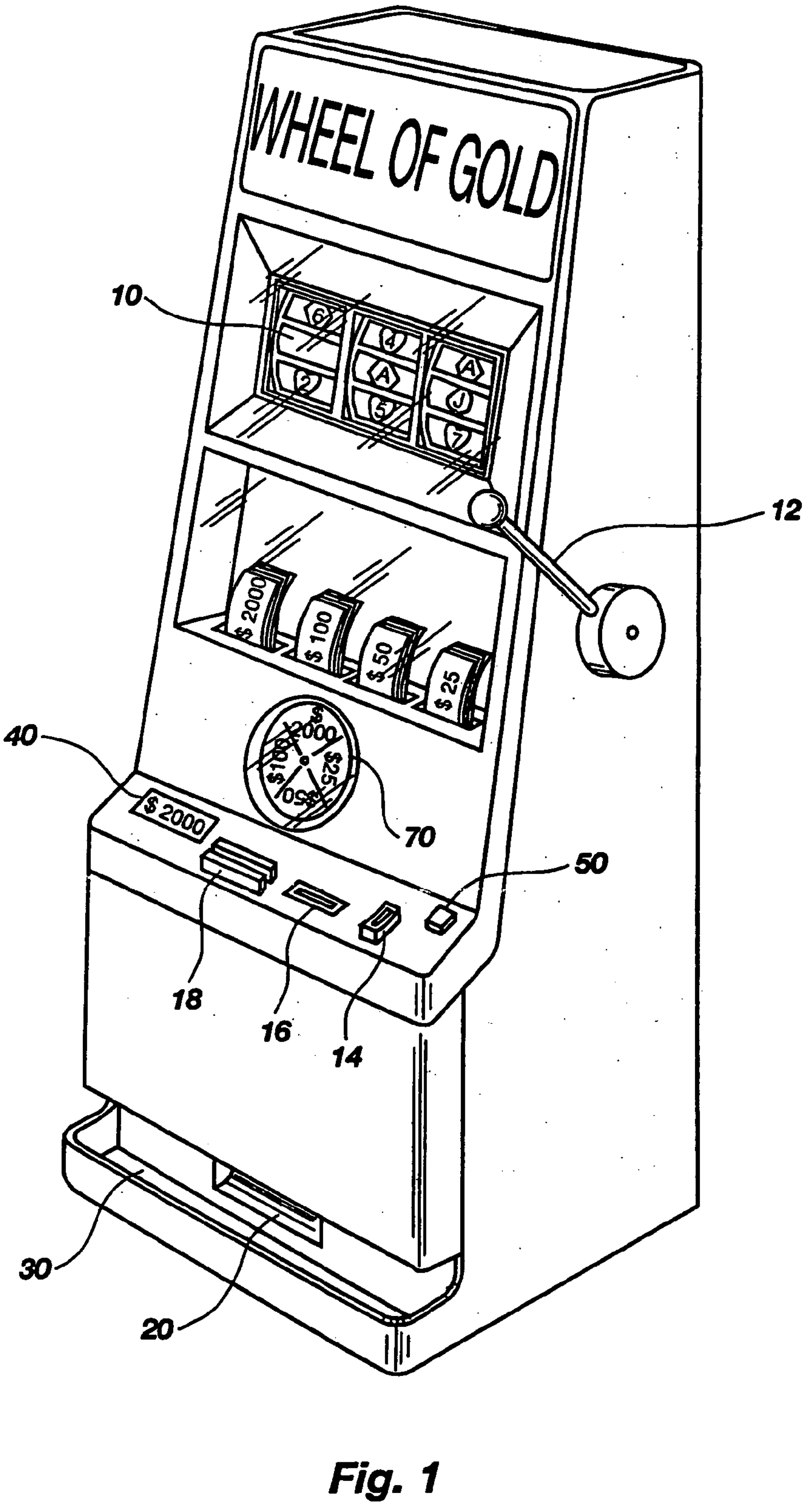
FIG. 1 is a perspective view of a gaming device of one embodiment of the present invention.

The various embodiments of the present invention are designed to provide added excitement to a board/table game or gaming device in order to increase the enjoyment of players and to serve as an added attraction to potential players. One preferred embodiment of the present invention, illustrated in FIG. 1, comprises a primary gaming unit which comprises three rotatable reels 10, each of which comprises a plurality of indicia on the periphery thereof. The illustrated gaming device comprises a mechanical lever 12, coin slot 14, currency validator 16 and credit card validator 18. In a manner which will be recognized by those skilled in the art, each reel 10 is designed to rotate and then stop in order to visually display at least one, and preferably a number of, indicia. If the collection of indicia displayed by the three reels is one of a predetermined plurality of winning indicia sets, then the player can typically be provided with a payout either through coin chute 20, which deposits winnings into a coin trough 30 or by increasing the player's credits in a credit window 40.

Figure 2:
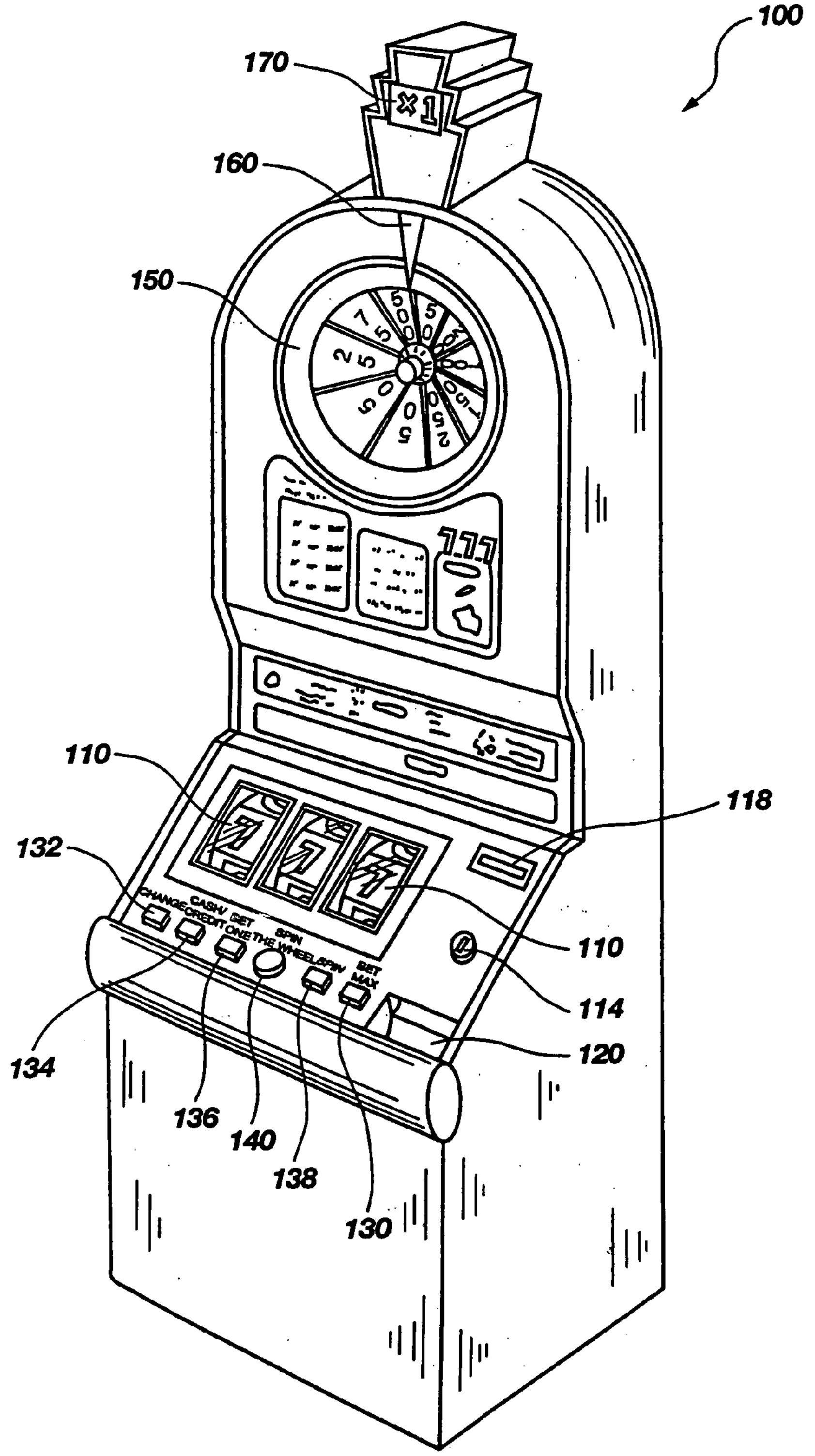
FIG. 2 is another embodiment of a gaming device of the present invention.

According to one aspect of the present invention, when the reels 10 display at least one of a plurality of predetermined winning indicia or indicia sets, then the player is provided with an opportunity for a secondary payout. According to this illustrated embodiment of the present invention, a bonus actuator button 50 is placed in an operative state when reels 10 display a bonus indicia set. A player must then depress bonus actuator 50 in order to start bonus indicator 70 spinning. In the illustrated embodiment, bonus indicator 70 is in the form of a rotatable wheel. The wheel may be a carnival-type wheel comprising pegs and a clapper or could take one or more other forms, such as a fanciful wheel typically used in a roulette game as shown in the embodiment of FIG. 2. If a preferred motor-driven wheel is utilized, it is preferably linked to some random value generator in order to randomly determine where the wheel will actually stop. In order to enhance the playing experience, sound effects corresponding to a clapper slapping against pegs of a carnival wheel are preferably provided as the wheel passes from one segment to another. The bonus indicator 70 is also preferably controlled so that the rate of spin is reduced, most preferably gradually reduced, prior to stopping in order to simulate a mechanical spinning wheel.

The facing surface of bonus indicator 70 of FIG. 1 comprises four distinct areas bearing indicia of the bonus payout to the player. In the illustrated embodiment, the bonus indicator has areas indicating bonuses of $25.00, $50.00, $100.00, and $2,000.00. When bonus indicator 70 stops, an indicator (not shown) will indicate the area on the bonus wheel corresponding to the amounts of the bonus to be provided to the player.

In a manner which will be appreciated by those skilled in the art, bonus indicator 70 can be operatively linked to a "payout" mechanism which provides a bonus payout to a player through coin chute 20 or by increasing the amount of winnings shown in credit window 40. As stated above, the payout of the bonus indicator can be in addition to a standard payout by the primary gaming unit or can be in place of the payout normally associated with the primary gaming unit.

Those familiar with gaming and game shows, will appreciate that players and observers typically experience a heightened level of anticipation and excitement as they observe one or more moving objects approaching a winning position. It is, therefore, most preferred for the bonus indicator of the present invention to be readily discernible, e.g., clearly visible and/or audible to the player.

According to another preferred embodiment of the present invention, a bonus indicator is connected to an electronic control unit, for example, a motor, which gradually decreases the rate of movement of the bonus indicator before the bonus indicator stops. According to this embodiment of the present invention, players can be provided with a realistic sense of a totally mechanical indicator. Those skilled in the art will appreciate that such a control unit can also be readily connected to a random generator which will randomly select the winning payout according to a predetermined frequency of occurrence for each, individual bonus payout, and then cause the bonus indicator to stop at the desired area. Those skilled in the art will also appreciate that other mechanisms can be utilized for gradually decreasing the rate of movement of the secondary payout indicator, e.g., a controlled braking system.

According to another embodiment of the present invention, when reels 10 display an indicia set which will provide a bonus, the bonus indicator becomes activatable but requires intervention by a house attendant, such as a casino attendant, in order to be activated. According to this embodiment of the present invention, the casino is provided with greater control over the actuation of the bonus indicator and, if desired, can accompany the actuation of the bonus indicator with great fanfare. It will be appreciated that the amounts of the bonus indicated in the figures are merely for purposes of illustration and, if desired, one of the amounts on the bonus indicator can have a significantly greater value. For example, one of the areas on the bonus indicator may correspond to a new automobile, a luxury vacation or a very large sum of money.

While the illustrated embodiment of the present invention in FIG. 1 is generally in the form of a rotatable wheel, other visible, mechanical indicia can be provided, whether controlled totally mechanically, electro-mechanically, or electronically, without departing from the scope of the present invention.

As shown in FIG. 1, in order to provide additional levels of excitement, indicia of the possible bonuses are preferably visibly displayed within the slot machine. For example, in one illustrated embodiment, a shelf is preferably displayed comprising piles of currency equal to the amounts on the bonus indicator. While actual cash is preferred, the slot machine may also be provided with fake currency or simply indicia of actual currency or the other bonus prizes.

A preferred embodiment of the present invention is illustrated in FIG. 2 wherein a gaming device 100 comprises a primary gaming unit in the form a standard three-reel slot machine which displays reels 110. Suitable controls and currency mechanisms including a coin slot 114, bill validator 118, payout chute 120 are provided. Furthermore, suitable player controls including CHANGE button 132, CASH/CREDIT button 134, BET ONE button 136, SPIN button 138 and BET MAX button 130 are also provided.

In addition to these standard controls, the control panel of this preferred illustrated embodiment of the present invention comprises a SPIN THE WHEEL button 140, which becomes actuatable when the primary gaming unit, as indicated by reels 110, has randomly selected one of a plurality of predetermined indicia sets. While the primary gaming unit shown in the lower portion of the cabinet of gaming device 100 will typically have the ability to provide a plurality of winning payouts, the SPIN THE WHEEL button 140 can become actuatable when the stopped reels 10 indicate some subset of the primary unit's winning indicia, when any one of the winning reel indicia is displayed, or further in response to one or more other predetermined indicia, or a combination thereof. For example, the SPIN THE WHEEL feature, or some other secondary game, can be actuated or become activatable in response to a single indicia indicated on one of the reels or reel indicia.

When the SPIN THE WHEEL button 140 is actuated by a player, bonus wheel 150 is caused to rotate and randomly select and display one of a plurality of different areas. According to the preferred illustrated embodiment, all of the bonus areas indicate an increased winning value for the player. However, it is within the scope of the present invention to provide nonmonetary prizes or losing spaces wherein no additional prize is provided and/or wherein the prize normally associated with the indicia shown on the primary gaming unit reels 110 is reduced. In the illustrated embodiment, a pointer 160 advantageously indicates the result of the bonus wheel or indicator 150.

In addition to the bonus wheel 150, this preferred illustrated embodiment of the present invention also comprises a bonus multiplier 170. The bonus multiplier 170 preferably randomly selects a value by which the bonus indicated by bonus wheel 150 is multiplied. For example, the bonus multiplier 170 can have an LED screen which cycles through multipliers of "times one," "times two" and "times three," which will indicate that the bonus is as indicated, doubled, or tripled, respectively. The bonus multiplier 170 can be programmed to select a multiplier either totally randomly or according to some other predetermined frequency of occurrence wherein certain multipliers will occur more frequently than other multipliers. While this illustrated embodiment comprises whole number multipliers, it is also within the scope of the present invention to utilize values other than whole numbers or to include multipliers which will result in a decrease in the value shown by the bonus wheel or indicator 150. For example, a multiplier sequence could include a "times zero" value. When bonus wheel or indicator 150 is not in use, the multiplier LED window can be set to an attract mode wherein a message is displayed to players or potential players. For example, the LED display could either show a message in complete form or be set to sequentially display either words or individual letters, such as "S P I N - T H E - W H E E L."

According to the various embodiments of the present invention, the bonus multiplier or additional payout multiplier is most preferably synchronized with the movement of the rotatable wheel or indicia of a rotatable reel, such that the multiplier value will change as each wheel segment passes the indicator. The most preferred embodiments of the present invention additionally comprise audible signals, such as the clicking of a clapper of the type found on an actual spinning wheel comprising a clapper indicator and pegs which strike the clapper. The audible signals are preferably also synchronized with the segments of the wheel such that an audible signal is provided as the wheel moves from one segment to another. This advantageously provides the effect of a mechanical wheel comprising pegs moving past a mechanical clapper.

Figure 3:
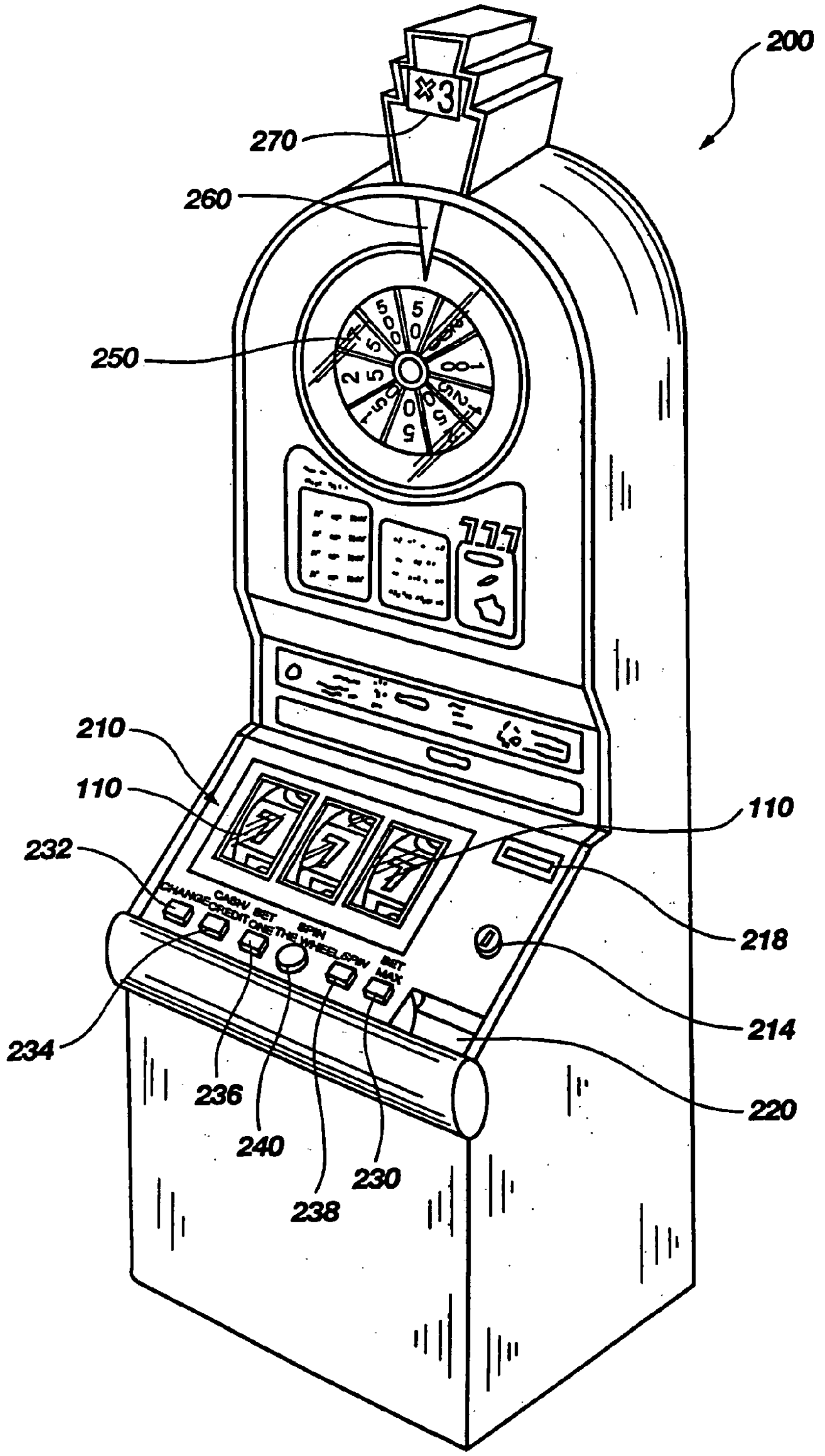
FIG. 3 illustrates an alternative embodiment of the present invention.

FIG. 3 illustrates a less-preferred embodiment of the present invention wherein a gaming device 200 comprises similar controls as the controls illustrated in the embodiment of FIG. 2. In this illustrated embodiment, a bonus indicator 250 is in the form of an electronically generated image, such as a video screen or an LED display and provides discernible indicia, e.g., a visual video display, of a bonus wheel. For example, the video display can show a wheel of the type used in a roulette game such as the wheel 150 illustrated in FIG. 2. A bonus multiplier 270 is also illustrated.

The slot machine shown in FIG. 3 comprises a video display 210, such as a video screen, which displays three reels 110, each of which comprises a plurality of indicia. In addition, this slot machine comprises a video display for displaying bonus indicator 250, such as a second video screen. While separate screens are preferred, both the reels and the bonus payout indicator could be displayed on the same video screen. According to this embodiment of the present invention, the bonus payout indicator displays indicia of a wheel or a reel.

In a manner known in the art, the gaming device comprises a coin slot 214, a currency validator 218, and a coin chute 220. A CHANGE button 232 and CASH/CREDIT button 234 are also provided. After placing a wager, a player determines the amount of his wager by either pressing the BET ONE button 236 or the BET MAX button 230. After the player has selected the amount of his wager, he depresses the SPIN button 238, which "spins" the reels 110 shown in the window of video display 210.

Each indicia of a displayed reel 110 is designed to indicate rotation and then stop in order to visually display at least one, and preferably a number of indicia. When reels 110 display a particular indicia set or one of a predetermined plurality of indicia sets in video display 210, then the additional payout mode is activated and the video display displaying payout indicator 250 is placed in an operable state. In this illustrated embodiment, the displayed payout indicator 250 displays an indicia of a rotating wheel comprising a plurality of distinct areas bearing indicia of payouts to the player. Payout indicator 250, is caused to selectively indicate one of the plurality of indicia, either automatically, upon intervention of a casino or house attendant, or upon a player depressing SPIN THE WHEEL button 240 in order to start payout indicator 250 spinning. It will be appreciated that the amounts of the payout indicated in FIG. 3 are merely for purposes of illustration and, if desired, one of the amounts on the bonus indicator can have a greater value, e.g., a new automobile, a luxury vacation or large sum of money which may be collected subsequently, or lesser values, e.g., no payout.

The displayed reels 110 and displayed bonus indicator 250 can be operably controlled by suitable controls to gradually slow down as they come to a complete stop, displaying a selected reel indicia and a bonus indicia, respectively.

The embodiment of the present invention illustrated in FIG. 2 is considered most preferable since it is believed that players prefer to see actual slot reels and an actual bonus wheel spinning in a gaming device. Other, less preferred embodiments are also possible while providing some of the advantages of the present invention. Specifically, it is feasible to replace the spinning reels with other forms of standard gaming units, for example, a visible indicia of reels or indicia of playing cards, shown, for example, on a video screen. It is also possible to replace the wheel with some other discernible indicia of a mechanical bonus indicator which is operatively connected to the first standard gaming unit and which either automatically commences or is actuatable in response to the result provided by the standard gaming unit. According to the present invention, both the standard gaming unit and the bonus indicator are controlled to provide random results.

From the foregoing description, it will be appreciated that embodiments of the present invention, which are specifically directed to gaming and gaming devices, comprise three different indicators. The most preferred embodiments comprise a primary (standard) gaming unit, an additional payout indicator, preferably in the form of a wheel, and a payout multiplier. While the payout multiplier of the illustrated embodiments is in the form of an electronically selected value, it is also within the scope of the present invention to have a multiplier which involves some skill on the part of a player. For example, according to an additional preferred embodiment of the present invention, a player will shoot actual projectiles, such as coins, at one or more targets in an effort to increase the value of the multiplier. In any of the embodiments of the present invention utilizing a multiplier, the multiplier can affect the value of a payout from the standard gaming unit, the additional payout indicator, or both the standard gaming unit and the payout indicator.

As stated above, the present invention also includes methods of conducting a wagering game of chance comprising the steps of providing a player with an opportunity to place a wager; displaying a randomly selected combination of indicia, the displayed indicia selected from the group consisting of reels, indicia of reels, indicia of playing cards, and combinations thereof, generating at least one signal corresponding to at least one select display of the indicia; and providing at least one discernible indicia of a mechanical bonus indicator, the bonus indicator indicia indicating at least one of a plurality of possible bonuses, wherein the bonus indicator indicia is in the form of a wheel or reel and is actuable in response to the signal. A further preferred method comprises the step of displaying at least one value by which a payout may be multiplied.

Another method of the present invention comprises the steps of requiring at least one player to make a wager; displaying at least one randomly selected playing card from a predetermined card indicia set; displaying and rotating a rotatable wheel comprising a plurality of indicia corresponding to a plurality of prizes if the displayed playing card indicia was one of a preselected plurality of winning card indicia; and determining a winning payout with the wheel, wherein the winning payout is randomly selected.

Figure 4:
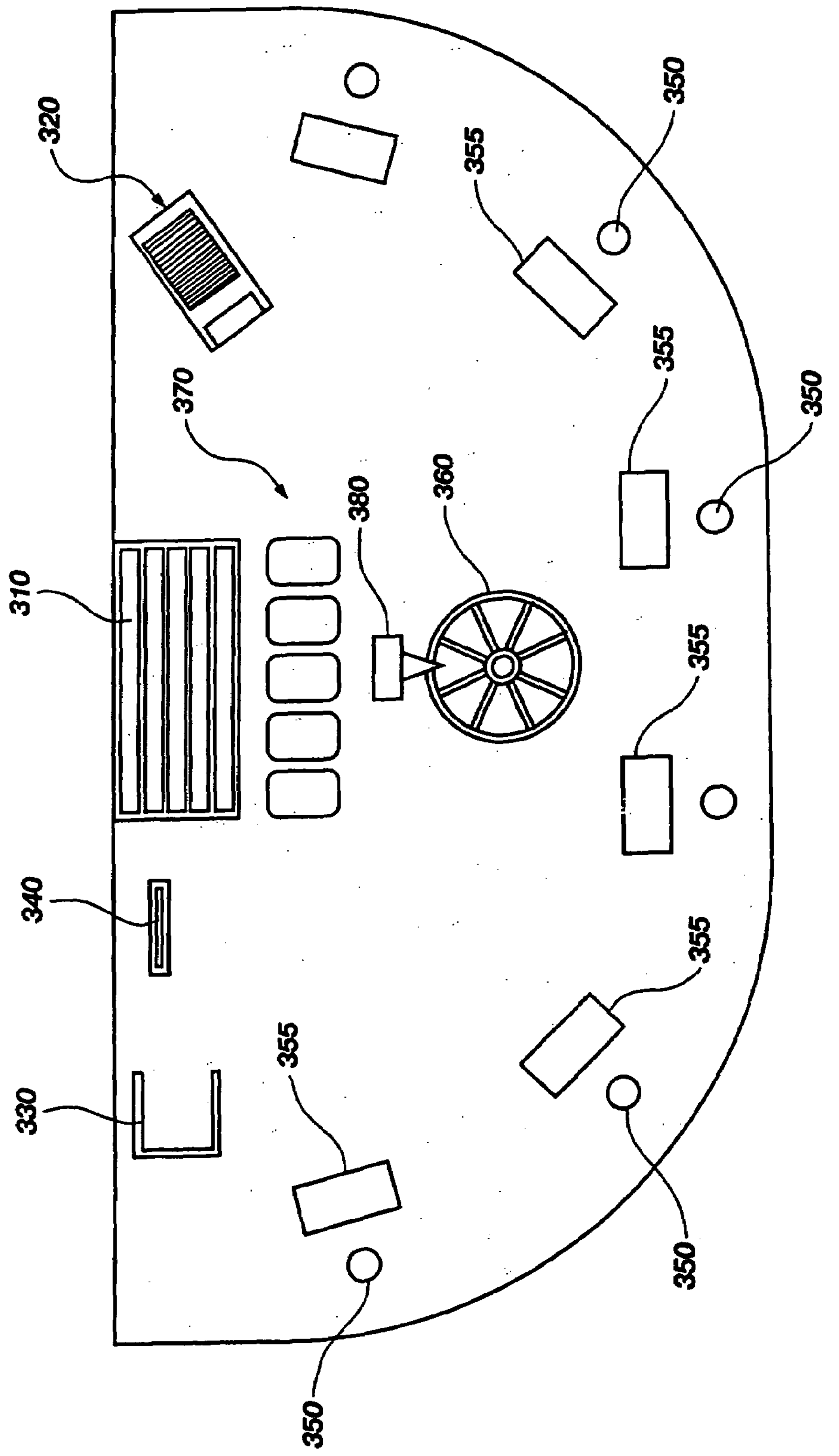
FIG. 4 is an alternative embodiment of the present invention in the form of a table game.

Another embodiment of the present invention in the form of a table game is illustrated in FIG. 4 wherein a chip rack 310, card shoe 320, discard shoe 330, wager slot 340, betting areas 350, and secondary event wheel or payout indicator 360 are provided. According to this embodiment of the present invention, after one or more players have placed wagers in wagering areas 350, a dealer will provide cards to the wagering players in areas 355 and then provide cards to himself in card area 370. After the cards have been dealt, the initial bets can be resolved by comparing the players' cards to the dealer's cards. While the illustrated game is shown as five card stud poker, other games and arrangements can also be utilized without departing from the scope of the present invention. For example, a player's cards can be compared to other players' cards or a predetermined payout schedule, or other card games can be utilized including seven card draw, five card draw poker, blackjack, etc.

Upon the happening of a predetermined occurrence, such as the receipt of one of a preselected plurality of card hands, one or more of the players can be given the opportunity to spin the payout indicator 360, which is most preferably electronically operated by an actuation switch. The actuation switch can be within reach of the players for added excitement or can be actuated by the dealer. Alternatively, actuation by a player's actuator switch can require prior actuation of a dealer switch, which will then render the player's switch operable. If less than all of the players are going to benefit from the results of payout indicator 360, additional indicators can be positioned proximate the players in order to indicate which players are involved in the spin of payout indicator 360. In a manner similar to that shown in FIG. 2, a payout multiplier 380 is also provided. Sound effects as referenced above and means for gradually decreasing the rate of movement of the payout indicator 360 are also preferably provided.

In addition to the primary gaming unit or primary game, the secondary event, and the multiplier, another preferred aspect of the present invention which can be utilized with all previously described embodiments comprises a DOUBLE-OR-NOTHING feature wherein winning players may wager their winnings in a double-or-nothing fashion. According to this feature of the present invention, a player may be provided with the opportunity to bet on red or black after he has won a game. For this purpose, the rotatable wheels of the present invention are preferably provided with alternating red and black pie-shaped segments. According to this feature, a player can be provided with the opportunity of betting on red or black with the opportunity of doubling his winnings if he makes a correct selection. After the player makes his selection, the wheel would be rotated to determine whether the player has successfully doubled his winnings or has lost those winnings. A player may be provided with the opportunity of utilizing the double or nothing feature several times and/or up to a certain maximum to be determined by the game operator.

Another embodiment of the present invention comprises a method of conducting a game of chance wherein a player is provided with an opportunity to place at least one of a plurality of possible initial wagers. The initial wager either activates a primary gaming unit or renders the primary gaming unit activatable by the player, for example, by illuminating a button. The primary gaming unit displays a randomly selected primary display which, if it is one of a preselected plurality of primary displays, qualifies the player to receive a primary award, to play a secondary gaming unit, or both.

Figure 5:
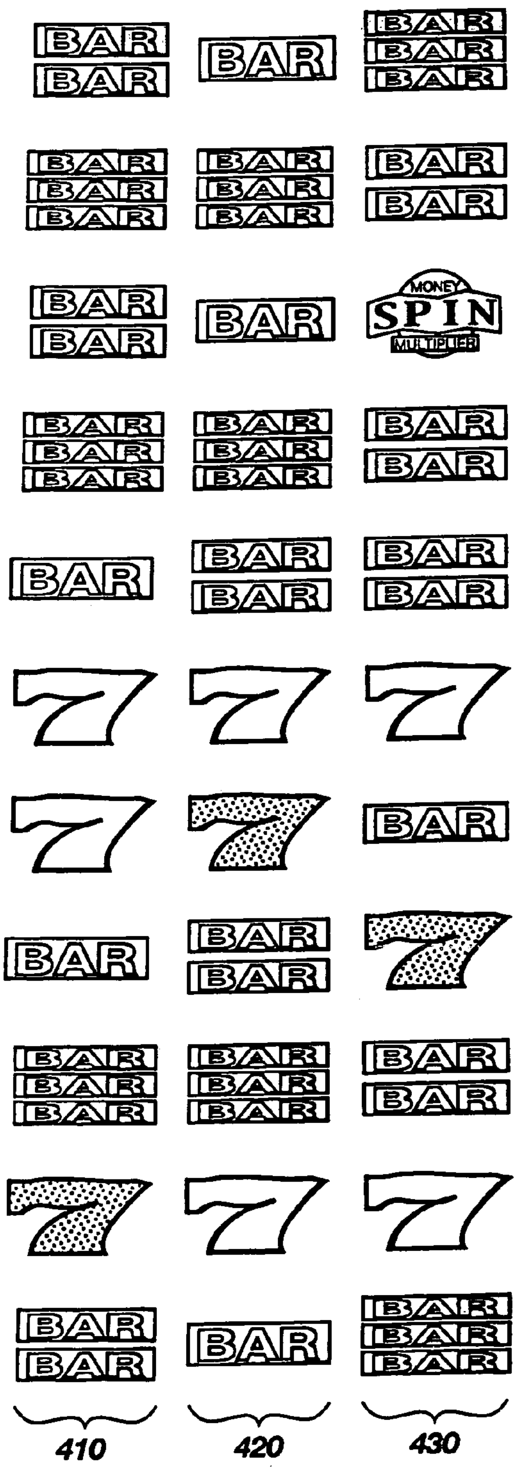
FIG. 5 illustrates a sample of three reel strips which may be used on the primary gaming unit.
Figure 6:
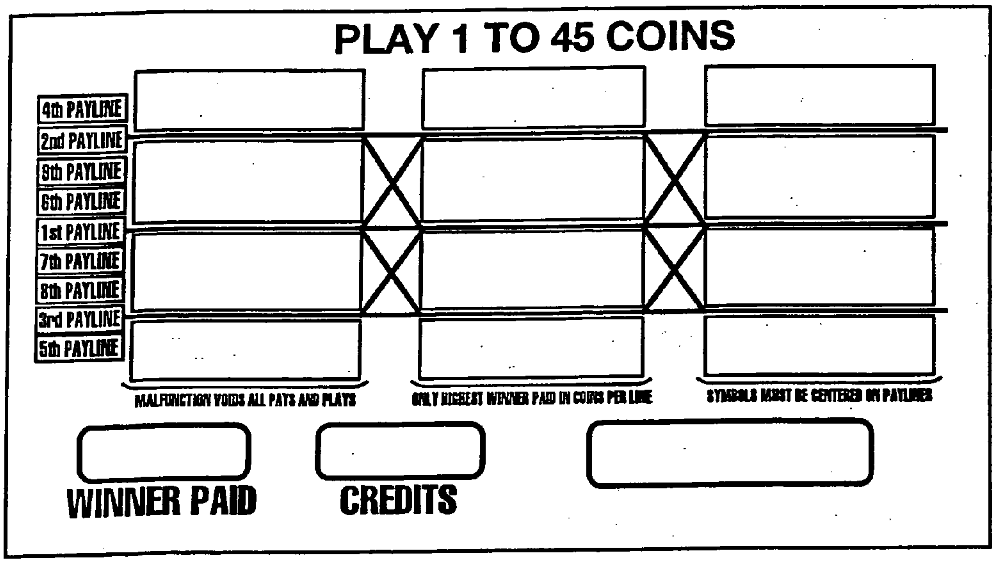
FIG. 6 illustrates one embodiment of the payout window used in conjunction with three reel strips shown in FIG. 5.

FIG. 5 illustrates a sample of three reel strips 410, 420, and 430 which may be used on the primary gaming unit in conjunction with the payout window shown in FIG. 6. As illustrated, this embodiment of the present invention provides a player with nine paylines. According to the present invention, the player can be provided with a single payline for each coin wagered or, alternatively, a plurality of paylines, depending upon the number of coins wagered. For example, a player can get one payline for wagers of one to five coins while a player would receive a second payline for wagers of six to ten coins, and so on to a maximum number of nine paylines for a wager of forty-five coins.

The secondary gaming unit of this embodiment of the present invention is intended to become activatable if the player receives a predetermined outcome on the primary gaming unit.

Figure 7:
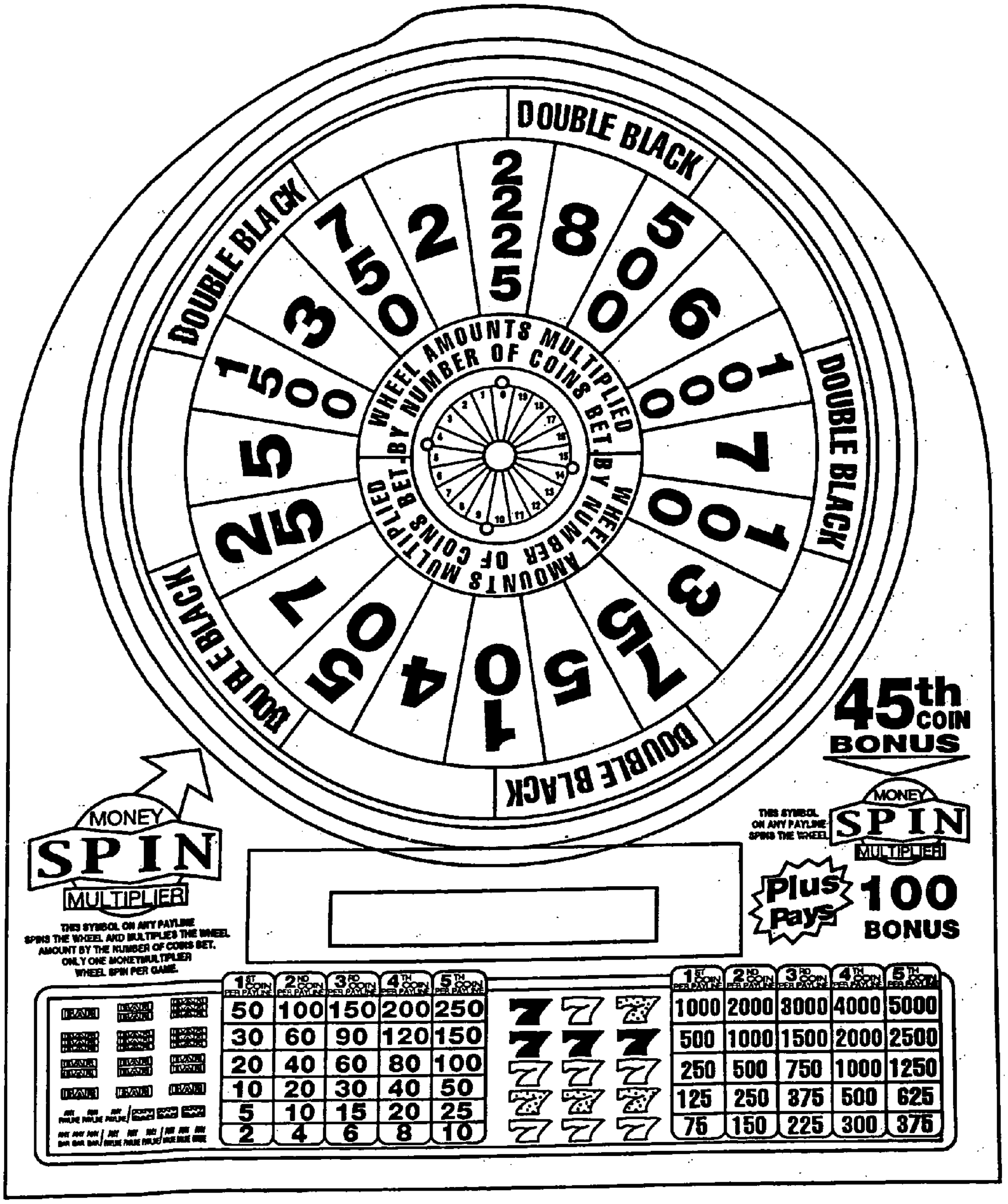
FIG. 7 illustrates one embodiment of the secondary gaming unit in the form of a rotatable wheel.

According to this embodiment of the present invention, a secondary gaming displays a plurality of secondary indicia, which when selected, is multiplied by the amount wagered by the player to determine the player's winning award from the secondary gaming unit. The secondary gaming unit is most preferably in the form of a rotatable wheel, such as the wheel shown in FIG. 7, or can comprise a wheel indicator wherein the wheel and the indicator are relatively movable. Other aspects and features of the embodiments of the present invention described above can also be advantageously combined with this embodiment as well as the other embodiments described herein. For example, the secondary gaming unit is most preferably only activatable if the player wagers one of a preselected plurality of possible wagers, such as the maximum wager. Those skilled in the art will appreciate that the degree of excitement to the player will be maximized with maximum wagers. Other aspects, such as the doubling feature described above, can also be provided to the player after the secondary indicia has been displayed by the secondary gaming FIGS. 8A through 13B of the drawings depict a number of exemplary implementations of an embodiment of the present invention (hereinafter referred to as the "upright rotational axis embodiment" employing a rotatable outcome display element oriented for rotation about a substantially upright axis of rotation to indicate a payout at cessation of rotation by alignment with at least one outcome indicator element. In FIGS. 8A through 13B, elements and features common among the various implementations illustrated are identified by the same reference numerals.

Figure 8A:
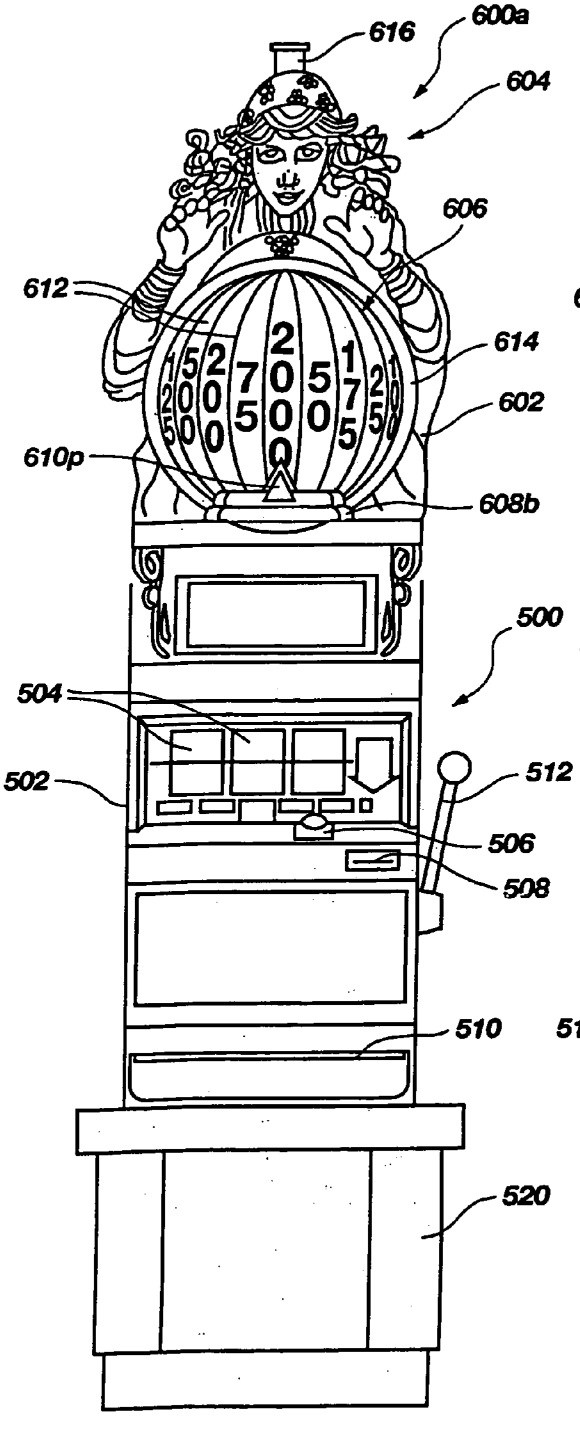
FIGS. 8A and 8B respectively comprise front and side elevations of a first exemplary implementation of one embodiment of a gaming device of the present invention employing a rotatable outcome display element oriented for rotation about a substantially upright axis of rotation.
Figure 8B:
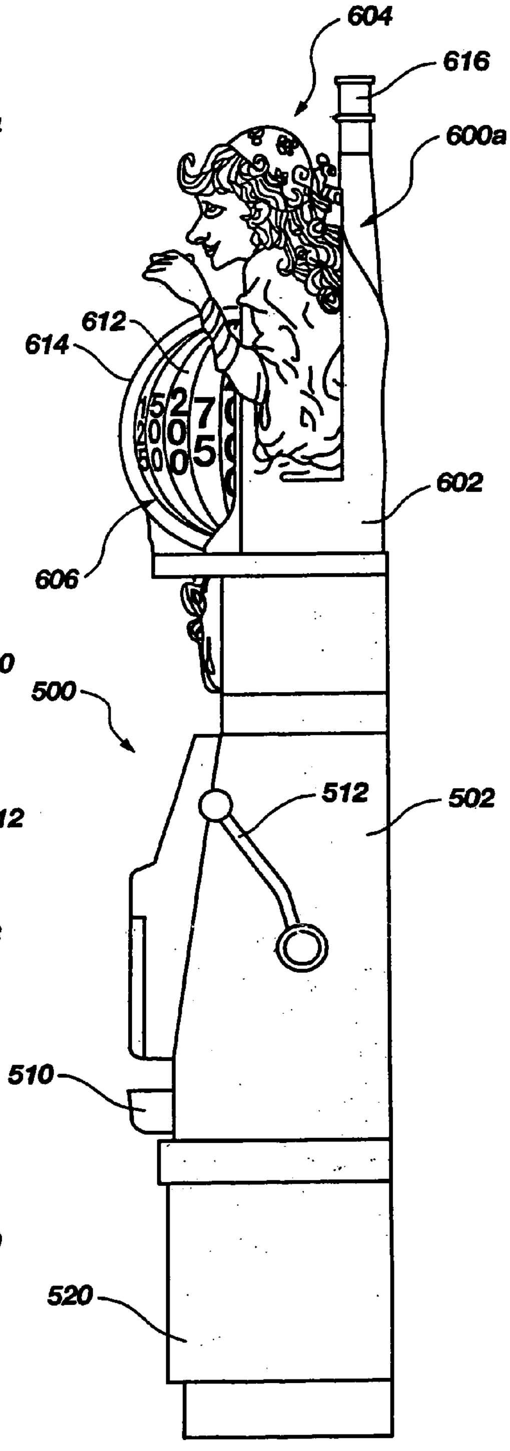

FIGS. 8A and 8B depict an exemplary implementation 600*a* of the upright rotational axis embodiment employed as a bonus or secondary game in association with a primary or base game, implementation 600*a* being configured as a top box placed on top of a conventional gaming device 500 configured as a multi-reel slot machine. Gaming device 500, as illustrated, includes a housing 502 including a plurality of independently rotatable reels 504, each reel bearing a number of different indicia or symbols (not shown), as known in the art. Suitable controls and currency mechanisms including a coin slot 506, bill validator 508, payout chute 510 and a player input element in the form of movable handle 512 are provided. Furthermore, suitable player controls including a CHANGE button, a CASH/CREDIT button, a BET ONE button, a SPIN button and a BET MAX button as discussed with respect to preceding embodiments may also be provided. As known in the art, housing 502 rests upon base 520 to place gaming device 500 at a convenient elevation for play.

Implementation 600*a* of the upright rotational embodiment includes a housing 602 configured with a three-dimensional representation of a female fortune teller 604 having her hands positioned over an outcome display element configured as a sphere 606 in the form of a crystal ball rotatable about a vertical axis and perceptibly resting on a base 608*b* having a pointer-style outcome indicator element 610*p* protruding upwardly therefrom. By way of example, implementation 600*a* may be offered as a game entitled "Madame Fortune," with appropriate signage. Sphere 606 is segmented into a plurality of mutually circumferentially adjacent sectors 612 which may be characterized as resembling slices of an orange, each sector 612 having associated therewith, and displaying, a potential game outcome of a plurality of outcomes represented by the number of sectors 612 of the sphere 606. As depicted, the game outcomes displayed on the sectors 612 are characterized numerically as payouts, for example as the number of coins per payout. As shown, sphere 606 is partially enclosed by housing 602 so that only substantially one half of sphere 606 is visible, and a transparent, hemispherical envelope 614 extends over the visible portion of sphere 606. A candle 616 as known in the art surmounts housing 602.

Figure 9A:
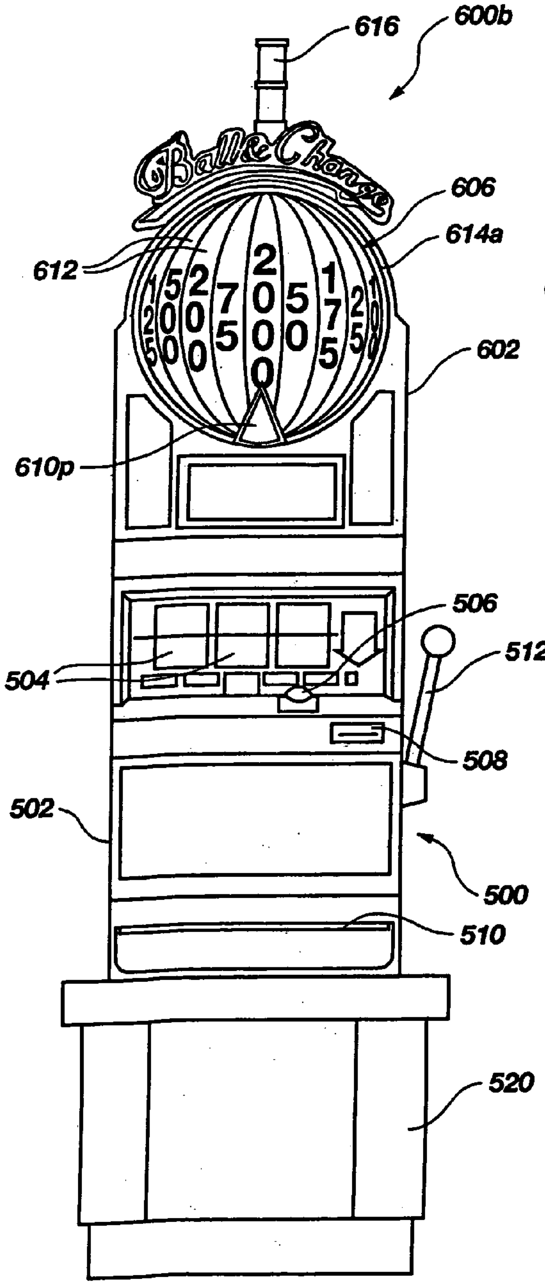
FIGS. 9A and 9B respectively comprise front and side elevations of a second exemplary implementation of one embodiment of a gaming device of the present invention employing a rotatable outcome display element oriented for rotation about a substantially upright axis of rotation.
Figure 9B:
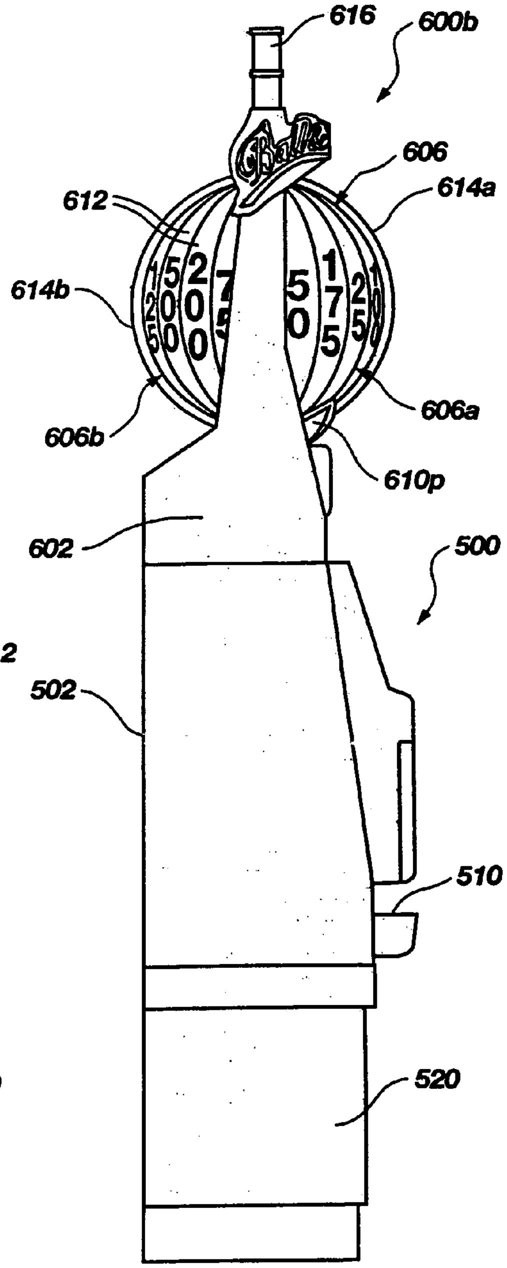

Referring to FIGS. 9A and 9B, implementation 600*b* of the upright rotational embodiment is depicted employed as a bonus or secondary game in association with a primary or base game 500 and includes a housing 602 bearing a heading "Ball&Change" positioned over an outcome display element in the form of a sphere 606 rotatable about a vertical axis and having associated therewith a pointer-style outcome indicator element 610*p* protruding upwardly from the underlying portion of housing 602. Sphere 606 is segmented into a plurality of mutually circumferentially adjacent sectors 612 which may be characterized as resembling slices of an orange, each sector 612 having associated therewith, and displaying, a potential game outcome of a plurality of outcomes represented by the number of sectors of the sphere 606. As depicted, the game outcomes displayed on the sectors 612 are characterized numerically as payouts, for example as the number of coins per payout. As shown, sphere 606 is partially enclosed proximate its midsection by housing 602 so that only a front portion 606*a* and a rear portion 606*b* of sphere 606 are visible, and transparent, hemispherical envelopes 614*a* and 614*b* respectively extend over the front and rear visible portions 606*a* and 606*b* of sphere 606. A candle 616 as known in the art surmounts housing 602.

Figure 10A:
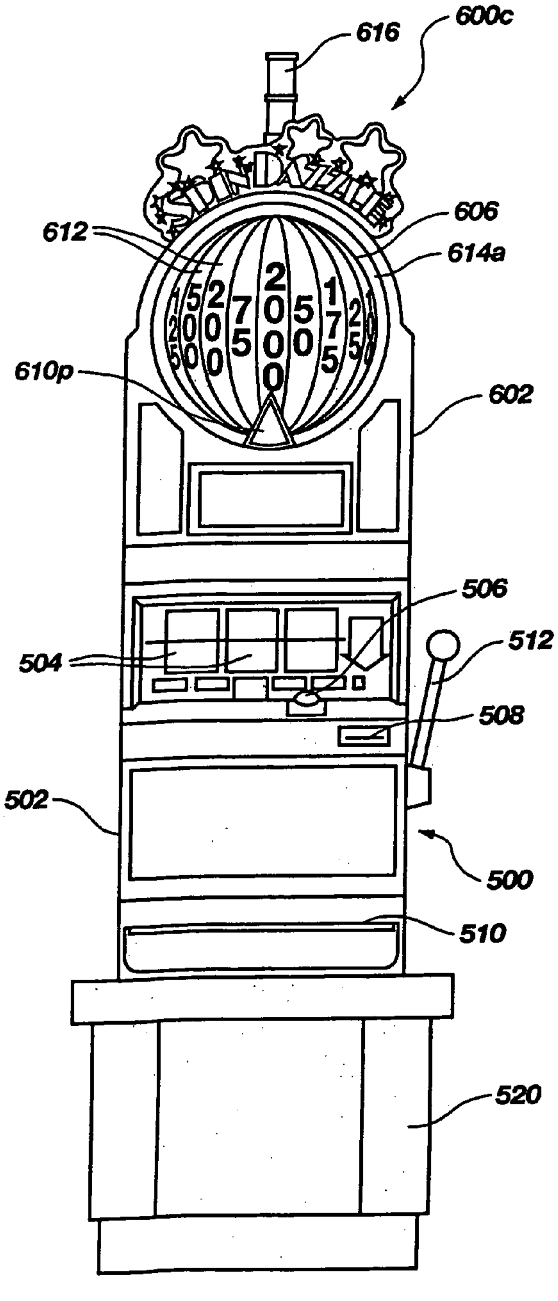
FIGS. 10A and 10B respectively comprise front and side elevations of a third exemplary implementation of one embodiment of a gaming device of the present invention employing a rotatable outcome display element oriented for rotation about a substantially upright axis of rotation.
Figure 10B:
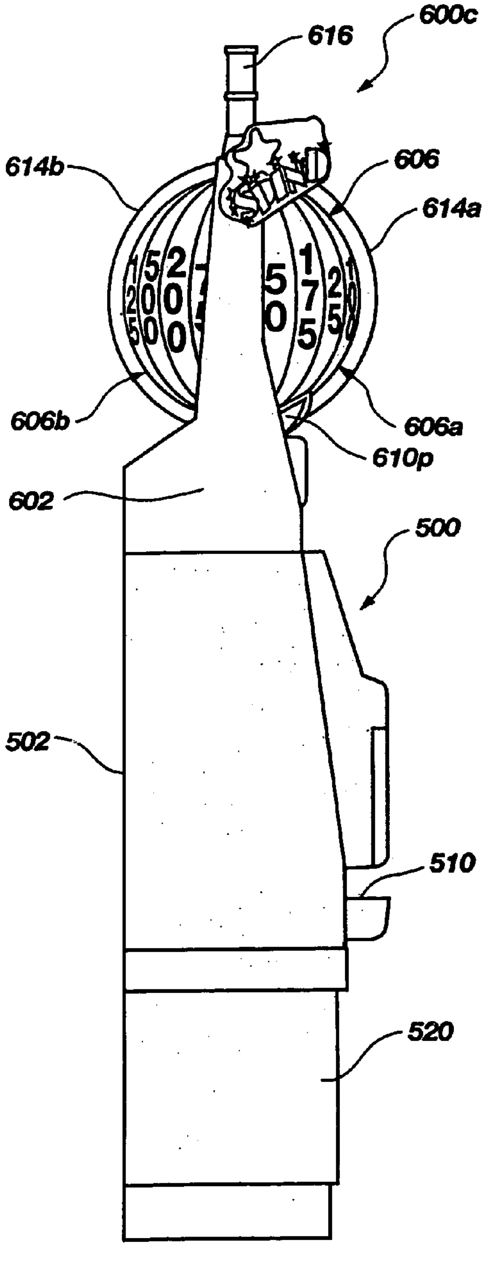

Referring to FIGS. 10A and 10B, implementation 600*c* of the upright rotational embodiment is depicted employed as a bonus or secondary game in association with a primary or base game 500 and includes a housing 602 bearing a heading "SpinDazzle" positioned over a display element formed as a sphere 606 rotatable about a vertical axis and having associated therewith a pointer-style outcome indicator element 610*p* protruding upwardly from the underlying portion of housing 602. Sphere 606 is segmented into a plurality of mutually adjacent sectors 612 which may be characterized as resembling slices of an orange, each sector 612 having associated therewith, and displaying, a potential game outcome of a plurality of outcomes represented by the number of sectors of the sphere 606. Sectors 612 may be surfaced with reflective elements and lights from inside housing 602 or outside aimed at sphere 606 for entertainment effect. As depicted, the game outcomes displayed on the sectors 612 are characterized numerically as payouts, for example as the number of coins per payout. As shown, sphere 606 is partially enclosed proximate its midsection by housing 602 so that only a front portion 606*a* and a rear portion 606*b* of sphere 606 are visible, and transparent, hemispherical envelopes 614*a* and 614*b* respectively extend over the front and rear visible portions 606*a* and 606*b* of sphere 606. A candle 616 as known in the art surmounts housing 602.

Figure 11C:
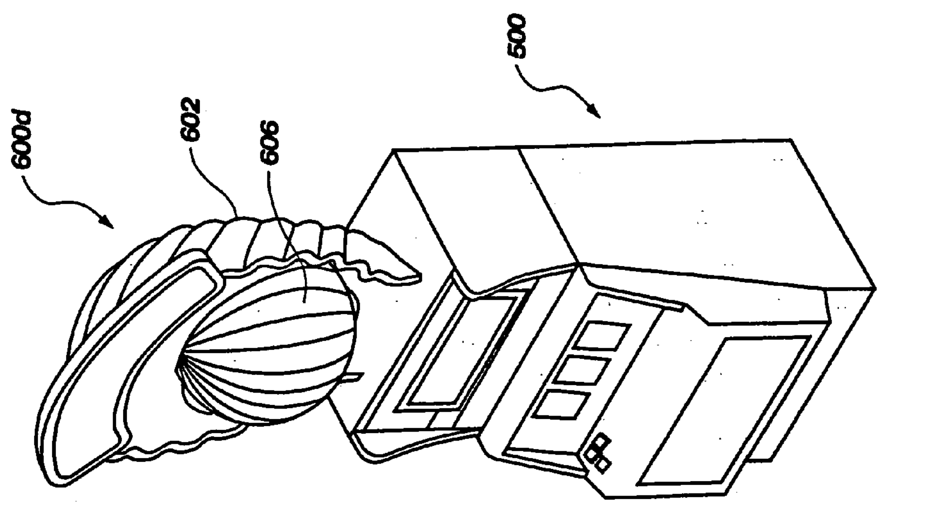
FIGS. 11A, 11B and 11C respectively comprise front, side and perspective elevations of a fourth implementation of one embodiment of a gaming device of the present invention employing a rotatable outcome display element oriented for rotation about a substantially upright axis of rotation.
Figure 11B:
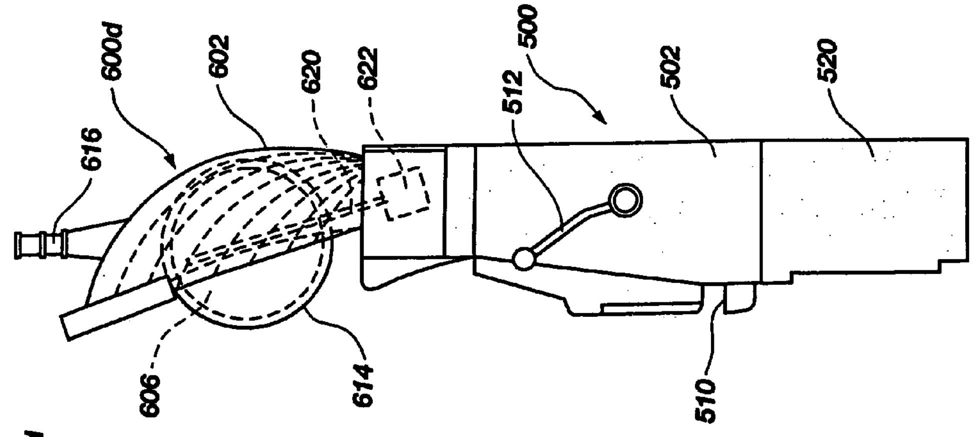
Figure 11A:
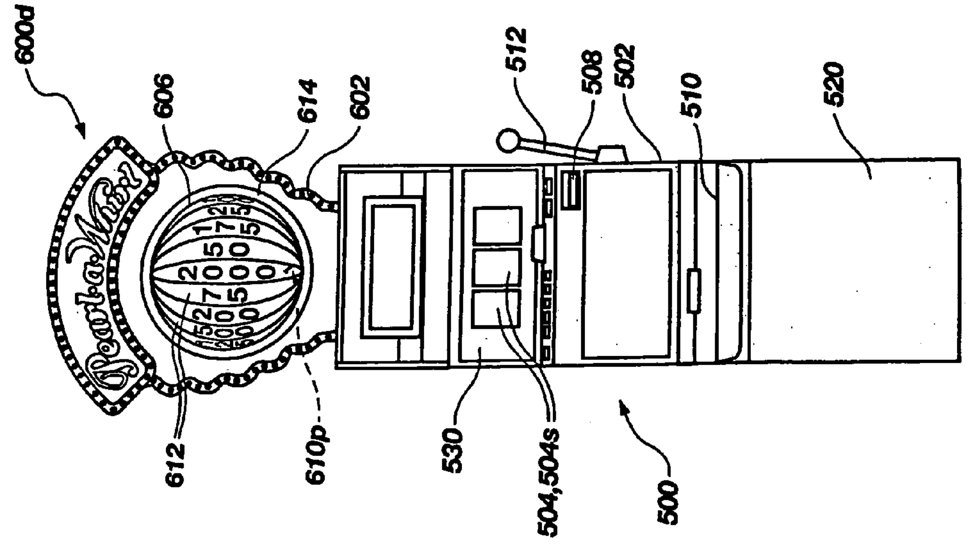

Referring to FIGS. 11A, 11B and 11C, implementation 600*d* of the upright rotational embodiment is depicted employed as a bonus or secondary game in association with a primary or base game 500 which, in this instance, displays a plurality of reels 504. Alternatively, and as well known in the art, reel simulations 504*s* on a video display 530 configured, for example, as a flat panel display, may be employed. Implementation 600*d* includes a housing 602 configured as a regular shell segment or valve of a bivalve mollusk bearing a heading Pearl A Whirl positioned over an outcome display element in the form of a sphere 606 having a pearlescent surface finish so as to resemble a pearl from an oyster. Sphere 606 is rotatable about an upright axis oriented at an acute angle to the vertical although, of course, implementation 600*d* may be configured with sphere 606 rotatable about a substantially vertical axis, as with other embodiments, and neither this embodiment or other embodiments are limited to exemplary axis orientations shown and described herein. Sphere 606 is segmented into a plurality of mutually circumferentially adjacent sectors 612 which may be characterized as resembling slices of an orange, each sector 612 having associated therewith, and displaying, a potential game outcome of a plurality of outcomes represented by the number of sectors of the sphere 606. As depicted, the game outcomes displayed on the sectors 612 are characterized numerically as payouts, for example as the number of coins per payout. As shown, sphere 606 is partially enclosed by housing 602 so that only somewhat less than one-half of sphere 606 is visible, and a transparent, partially hemispherical envelope 614 extends over the visible portion of sphere 606. An outcome indicator element 610*p* in the form of a pointer as shown in broken lines in FIG. 11A may be employed to indicate the sector 612 exhibiting the game outcome. A candle 616 as known in the art surmounts housing 602, as shown in FIG. 11B. As further depicted in broken lines in FIG. 11B sphere 606 is mounted for rotation on axle 620, which projects upwardly from stepper motor and driver assembly 622. As shown, axle 620 is cantilevered, but it is also contemplated that axle 620 may be supported by a bearing secured to housing 602 at the upper end of axle 620.

Figures 12A, 12B, 12C:
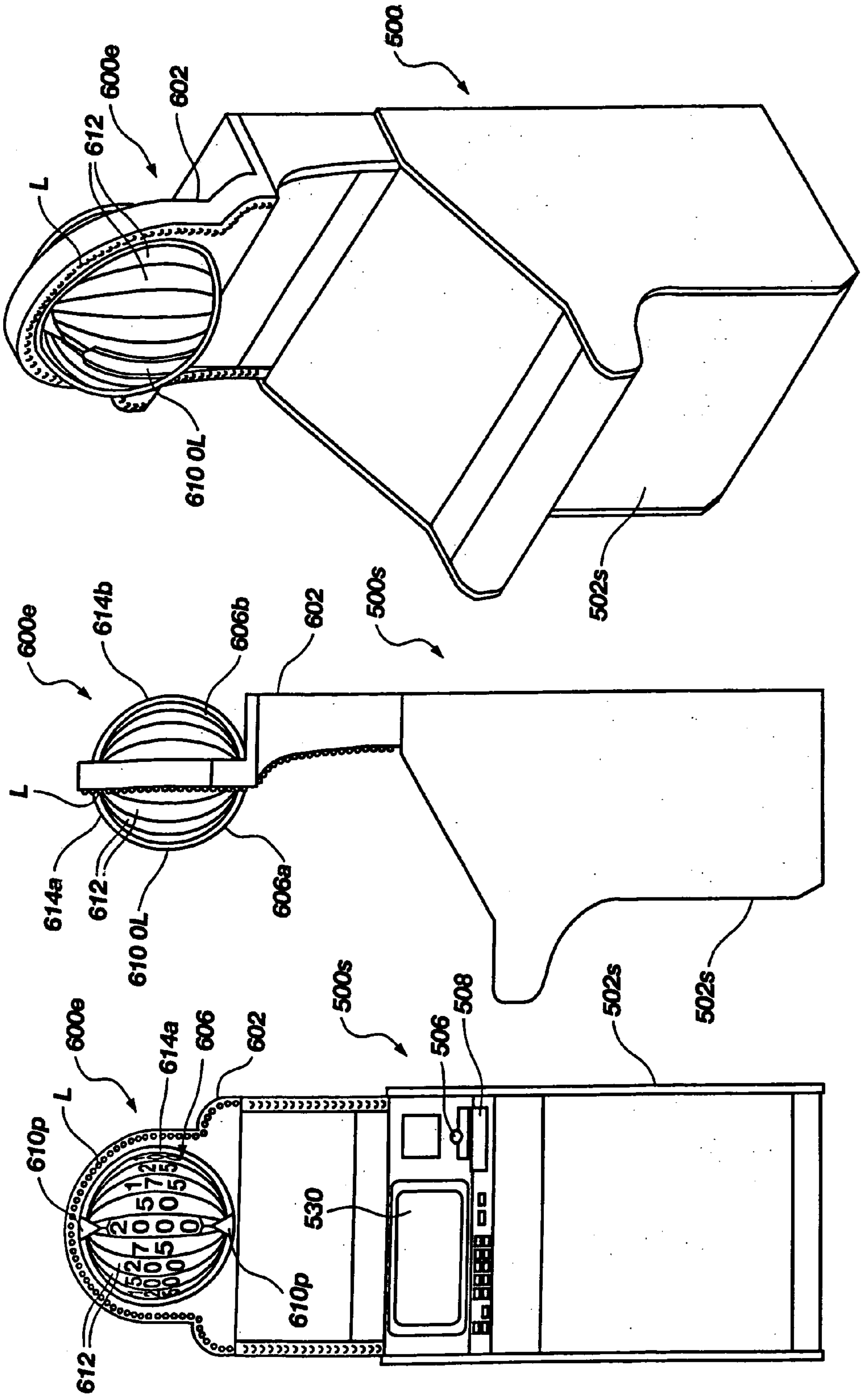
FIGS. 12A, 12B and 12C respectively comprise front, side and perspective elevations of a fifth implementation of one embodiment of a gaming device of the present invention employing a rotatable outcome display element oriented for rotation about a substantially upright axis of rotation.

Referring to FIGS. 12A, 12B and 12C, implementation 600*e* of the upright rotational embodiment is depicted employed as a bonus or secondary game in association with a primary or base game 500*s* which is configured as a so-called "slant" housing gaming device having a housing 502*s* bearing an upwardly-facing video display screen 530. Of course, a plurality of mechanical or electromechanical reels may also be employed to display the primary or base game 500*s* and its outcome. Such gaming devices may be configured for display of video images of rotatable reels, for play of video poker, blackjack, keno or bingo, or for any other suitable game of chance susceptible to video depiction.

Player control elements and devices for inputting wagers are shown (unnumbered) as known in the art. Implementation 600*e* includes a housing 602 bearing a line of lights L which is positioned over a sphere 606 rotatable about a vertical axis and having associated therewith vertically aligned pointer-style outcome indicator elements 610*p* respectively protruding upwardly from the underlying portion of housing 602 and downwardly from the overlying portion thereof and carrying an intermediate overlay element 610OL therebetween. Sphere 606 is segmented into a plurality of mutually adjacent sectors 612 which may be characterized as resembling slices of an orange, each sector 612 having associated therewith, and displaying, a potential game outcome of a plurality of outcomes represented by the number of sectors of the sphere 606. Sectors 612 may be surfaced with reflective elements and lights from inside housing 602 or outside aimed at sphere 606 for entertainment effect. As depicted, the game outcomes displayed on the sectors 612 are characterized numerically as payouts, for example as the number of coins per payout. As shown, sphere 606 is partially enclosed proximate its midsection by housing 602 so that only a front portion 606*a* and a rear portion 606*b* of sphere 606 are visible, and transparent, hemispherical envelopes 614*a* and 614*b* respectively extend over the front and rear portions 606*a* and 606*b* of sphere 606. Hemispherical envelope 614*a* may have pointer-style outcome indicator elements 610*p* and overlay 610OL imprinted or etched thereon. Fiber optic cables may be used, as known in the art, to illuminate overlay 610OL for emphasis on the sector underlying same when sphere 606 ceases rotation.

Figure 13A:
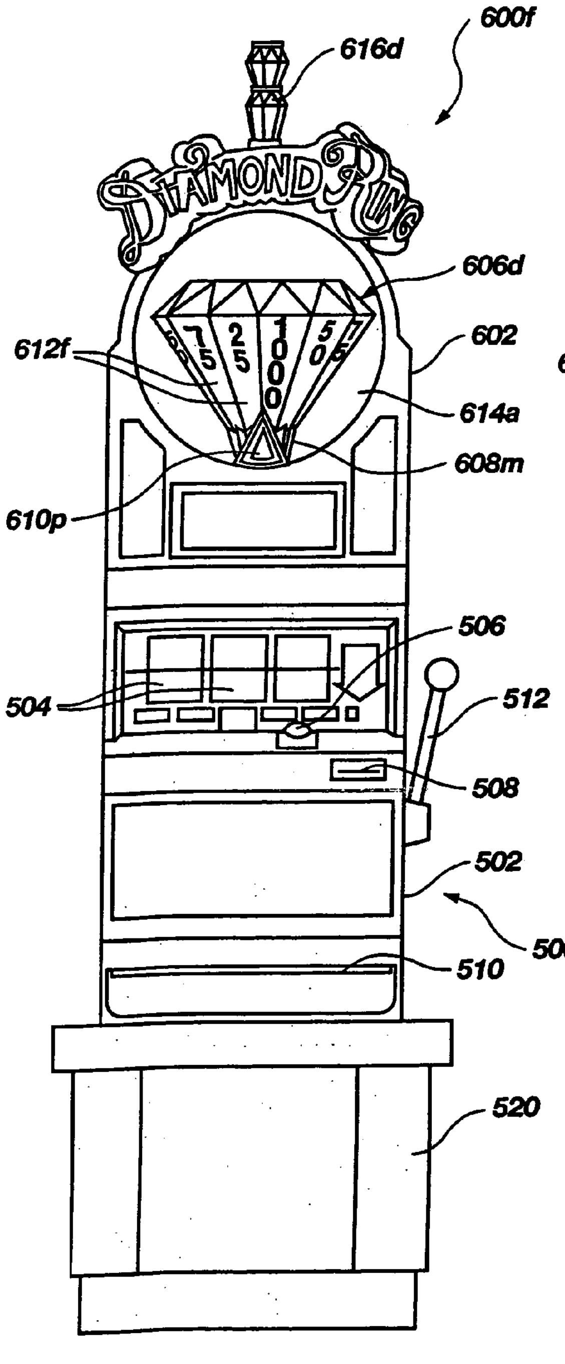
FIGS. 13A and 13B respectively comprise front and side elevations of a sixth implementation of one embodiment of a gaming device of the present invention employing a rotatable outcome display element oriented for rotation about a substantially upright axis of rotation.
Figure 13B:
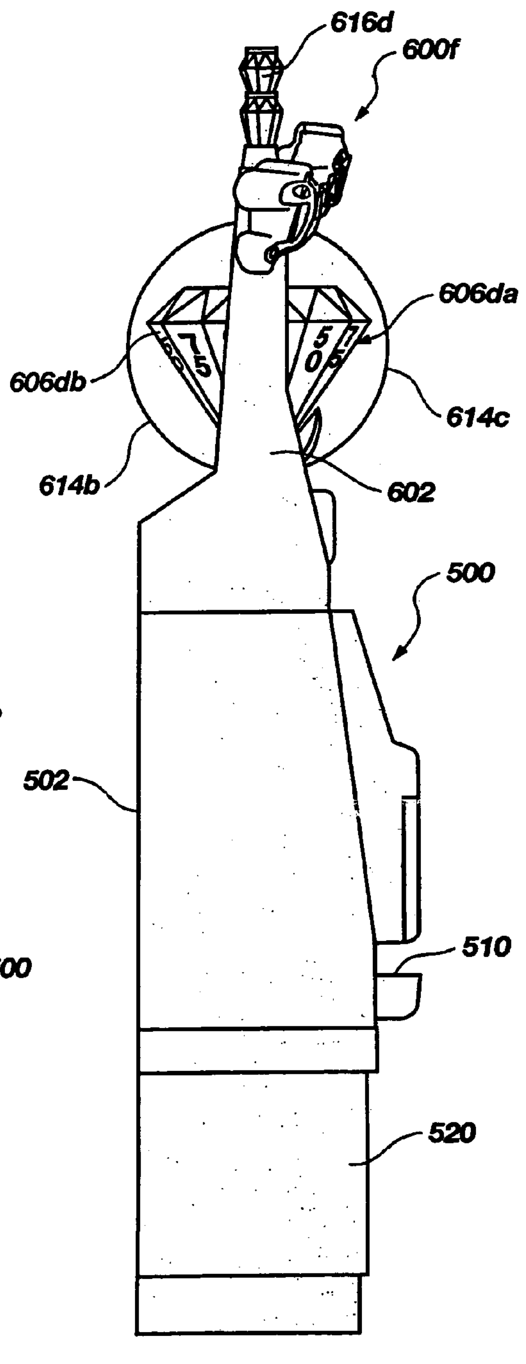

Referring to FIGS. 13A and 13B, implementation 600*f* of the upright rotational embodiment is depicted employed as a bonus or secondary game in association with a primary or base game 500 and includes a housing 602 bearing a heading "DIAMOND RING" positioned over a rotatable outcome display element configured as a gem and specifically as a diamond 606*d*, rotatable about a vertical axis and having associated therewith a pointer-style outcome indicator element 610*p* protruding upwardly from a representation of a "mounting" 608*m* for the "diamond" 606*d* and carried by the underlying portion of housing 602. It is contemplated that the implementation 600*f* may also be offered, by way of example, as a game entitled "Forever Diamonds," such title if employed being substituted for that shown in FIG. 13A. Diamond 606*d* is segmented into a plurality of mutually adjacent facets 612*f* which may be characterized as resembling facets of a jewel-cut diamond, each facet 612*f* having associated therewith, and displaying, a potential game outcome of a plurality of outcomes represented by the number of sectors of the diamond 606*d*. As depicted, the game outcomes displayed on the facets 612*f* are characterized numerically as payouts, for example as the number of coins per payout. Diamond 606*d* may be illuminated from the interior thereof, or by lights carried by housing 602 and directed thereon. As shown, diamond 606*d* is partially enclosed proximate its midsection by housing 602 so that only a front portion 606*da* and a rear portion 606*db* of diamond 606*d* are visible, and transparent, hemispherical envelopes 614*a* and 614*b* respectively extend over the front and rear visible portions 606*da* and 606*db* of diamond 606*d*. A candle 616*d* for use as known in the art but configured in a novel manner as superimposed diamonds surmounts housing 602.

Figure 14:
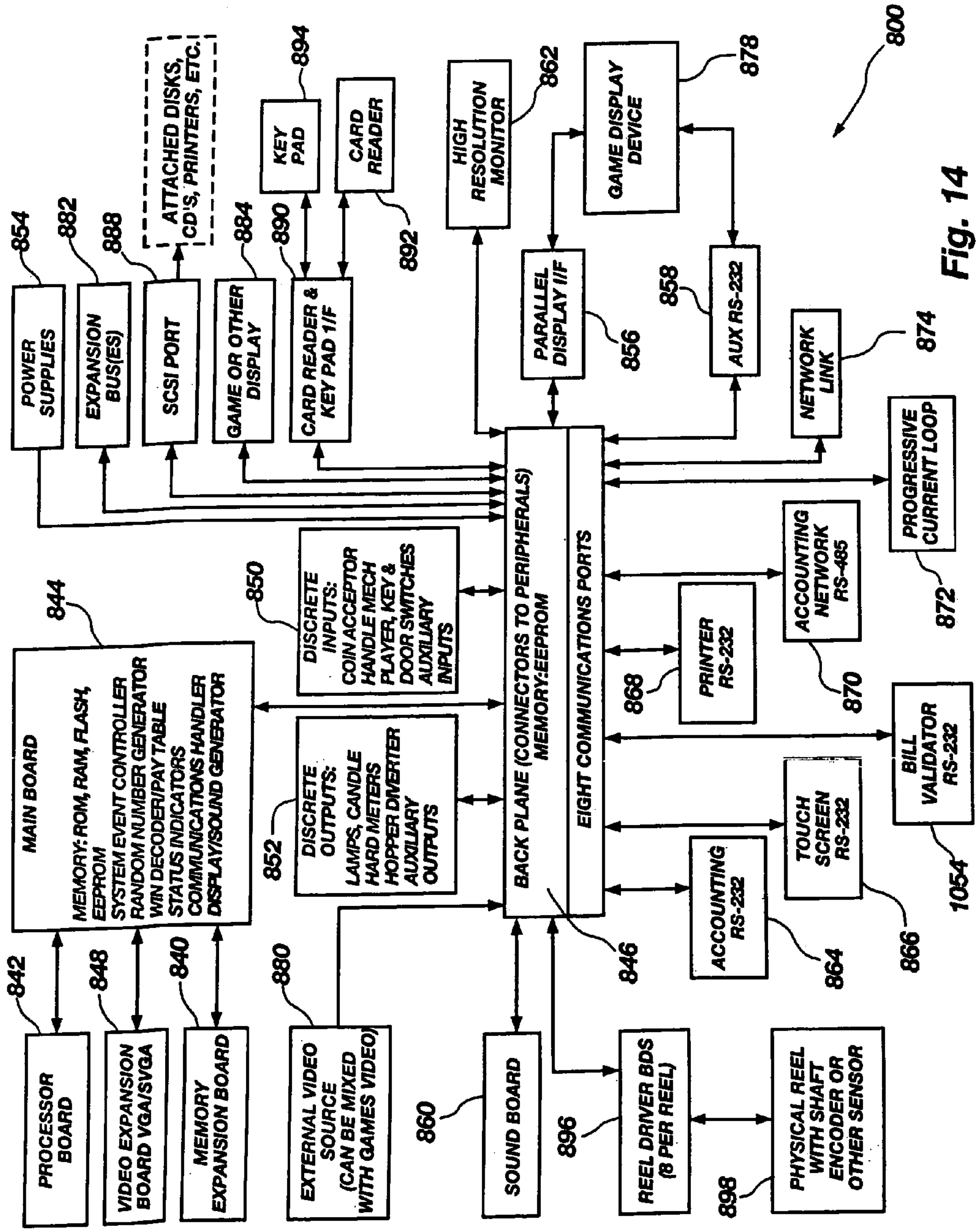
FIG. 14 is a schematic architecture for an exemplary gaming device suitable for use with the present invention.

In use and operation, and referring to FIG. 14, the system architecture for an exemplary gaming device 800 suitable for use in practicing the present invention includes a processor board 842, a main board 844 and a back plane 846 integrally or separately formed. The processor board 842 includes a video expansion board VGA/SVGA 848 that is operably coupled to the main board 844. The main board 844 preferably includes memory in the form of ROM, RAM, flash memory and EEPROM (electrically erasable programmable read only memory). The ROM includes the EEPROM. In addition, the main board 844 includes a system event controller, the random number generator, a win decoder/pay table, status indicators, a communications handler and a display/sound generator.

The main board 844 is operably coupled to the back plane 846 which includes memory, preferably in the form of an EEPROM and connectors to connect to peripherals. Furthermore, the back plane 846 provides a plurality of communication ports for communicating with external peripherals. The back plane 846 provides the coupling between discrete inputs 850 and the processor board 842 and main board 844. Typical examples of elements which provide discrete input 850 are coin acceptors, game buttons, mechanical hand levers, key and door switches and other auxiliary inputs. Furthermore, the back plane 846 provides the coupling between discrete outputs 852 and the processor board 842 and main board 844. Typically, elements that provide discrete outputs 852 are in the form of lamps, hard meters, hoppers, diverters and other auxiliary outputs.

The back plane 846 also provides connectors for at least one power supply 854 for supplying power for the processor board 842 and a parallel display interface ("PDI") 856 and a serial interface 858. In addition, the back plane 846 also provides connectors for a sound board 860 and a high-resolution monitor 862 as well as a display interface 856 operably coupled to at least one game display device 878. Furthermore, the back plane 846 includes communication ports for operably coupling and communicating with an accounting function 864, a touch screen 866, the bill validator 1054, a printer 868, an accounting network 870, a progressive current loop 872 and a network link 874.

The back plane 846 optionally includes connectors for external video sources 880, expansion buses 882, game or other display means 884, a SCSI port 888 and an interface 890 for at least one card reader 892 (debit/credit, player card, etc.) and key pad 894. The back plane 846 also preferably includes means for coupling a plurality of reel driver boards 896 which drive physical game reels 898 with a shaft encoder or other sensor means to the processor board 842 and main board 844. Such an approach may, of course, also be used to drive outcome display elements as employed in bonus games according to the present invention. Of course, the reels may be similarly implemented electronically by display as video images, technology for such an approach being well known and widely employed in the art. In such an instance, reel driver boards 896 and physical game reels 898 with associated hardware are eliminated and the game outcome generated by the random number generator on main board 844 is directly displayed on a video game display 884 and, optionally, on a separate game display device 878, as known in the art. Other gaming machine configurations for play of different wagering games such as video poker games, video blackjack games, video Keno, video bingo and any other suitable games are equally well known in the art.

It will also be understood and appreciated by those of ordinary skill in the art that selected components of gaming device 800 may be duplicated for play of a bonus or secondary game or event in accordance with the present invention, in that at least a separate board with a second random number generator may be employed, with associated peripherals and links thereto, for play of the bonus game. In the conventional situation wherein the bonus game of the present invention may be operably coupled as a "top box" or otherwise associated with a conventional, existing game machine configured for play of a base or primary game, many of the components illustrated in FIG. 14 and described with respect thereto will be duplicated, including separate hardware, software and associated memory for conducting play of the bonus game with associated pay tables for bonus awards.

Figure 15:
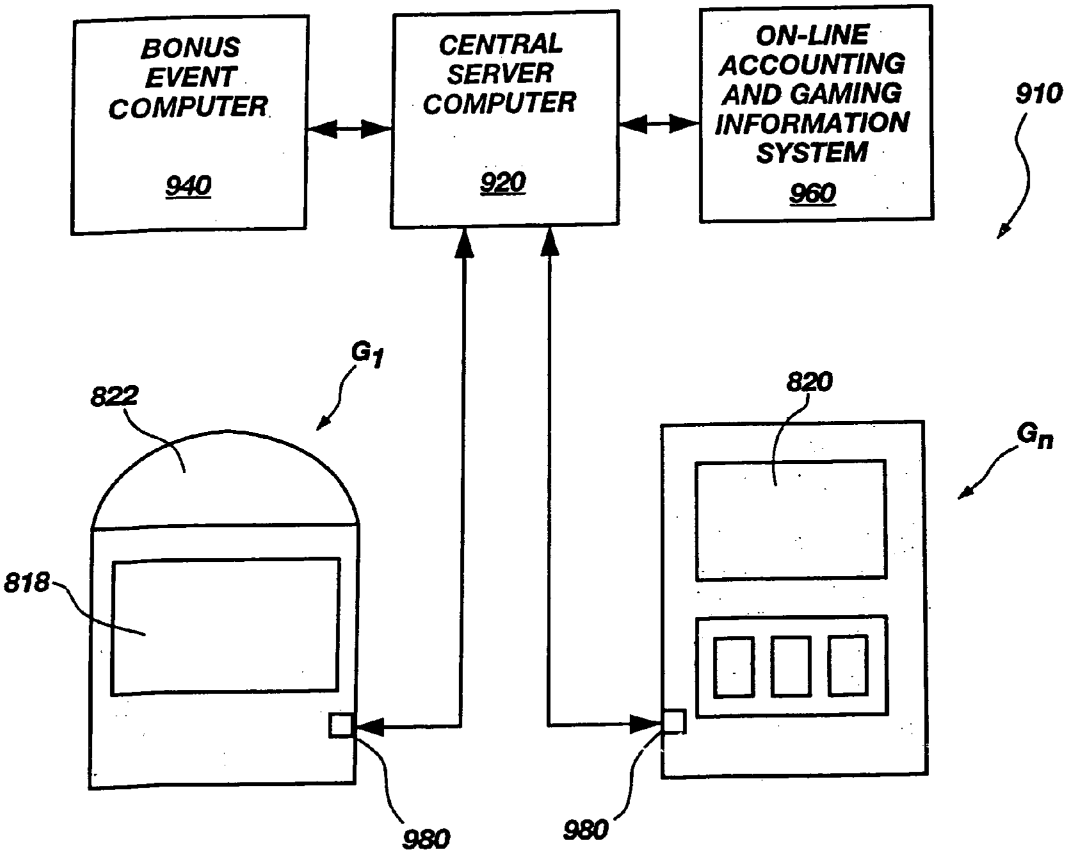
FIG. 15 is a schematic of a plurality of networked gaming devices linked to a central server computer.

In implementation of the present invention, the gaming machines offering play of the bonus event of the present invention may be deployed, as schematically depicted in FIG. 15, in a gaming network 910 that includes a central server computer 920 operably coupled to a plurality of gaming machine $G_1$, $G_2$ . . . $G_n$. which may include both electronic and reel-type game machines. It is notable that, unless the gaming network 910 is configured for progressive play, a variety of different makes of gaming machines G offering widely different games may be incorporated in gaming network 910, since the bonus event operates independently of the primary game on each gaming machine G. The central server computer 920 may be programmed to automatically interact with a plurality of gaming machines $G_1$, $G_2$ . . . $G_n$ during a bonus game triggered on any of them, and to initiate rotation of the outcome indicator display element thereof.

More specifically, and referring to FIGS. 14 and 15, the gaming network 910 includes, a central server computer 920, a bonus event computer 940 and a plurality of gaming machines $G_1$, $G_2$ . . . $G_n$. Each gaming machine $G_n$ includes a controller assembly 980 operably coupled to the central server computer 920 and is comprised of a controller unit designed to monitor multiple signals from each individual gaming machine $G_n$. In addition, the assembly 980 includes a network interface board fitted with appropriate electronics for each specific make and model of each individual gaming machine $G_n$.

Referring to FIG. 15, in electronic video games, the central server computer 920 is operably coupled to at least one video display element 818 as shown at the left-hand side of FIG. 15 and sequesters a portion of the video display element 818 for displaying video attract sequences to attract potential players. Video game display element 818 may be used for display of both primary and bonus games, as desired. Where the gaming network 910 includes reel-type gaming machines $G_1$, $G_2$ . . . $G_n$ as shown at the right-hand side of FIG. 15, the central server computer 920 may be operably coupled to at least one active display element 820 so that potential players receive a clear indication of attract sequences and the at least one active display element 820 may be used as a video display for a bonus game, if such employs video rather than movable mechanical elements. As shown at the left-hand side of FIG. 15, the gaming machines $G_1$, $G_2$ . . . $G_n$ may also be provided with a second video display element 822 as an alternative to sequestering a portion of the gaming display monitor for displaying video attract sequences and the bonus game. In addition, the central server computer 920 includes sound generating means for producing attractive sounds at each gaming machine $G_n$ which are orchestrated with the video sequences at each of gaming machines $G_1$, $G_2$ . . . $G_n$ if such is not already incorporated therein. The games support input and output between the player and the game for such devices as heads up display, joystick, keyboard, mouse and data glove via interface modules connected through the expansion bus or buses 882 and SCSI port 888.

The attractive multimedia video displays and dynamic sounds may be provided by the central server computer 920 by using multimedia extensions thereby allowing gaming machines $G_1$, $G_2$ . . . $G_n$ to display full-motion video animation with sound to attract potential players to the machines. During idle periods, the gaming machines preferably display a sequence of attraction messages in sight and sound. The videos may also be used to market specific areas of the casino and may be customized to any informational needs.

Furthermore, the gaming network 910 includes bonus computer 940 operably coupled to the central server 920 for scheduling bonus parameters such as the type of bonus game, pay tables and players. Preferably, the gaming network 910 further includes a real-time or on-line accounting and gaming information system 960 operably coupled to the central server computer 920. The accounting and gaming information system 960 includes a player database for storing player profiles, a player tracking module for tracking players and a pit, cage and credit system for providing automated casino transactions.

Figure 16:
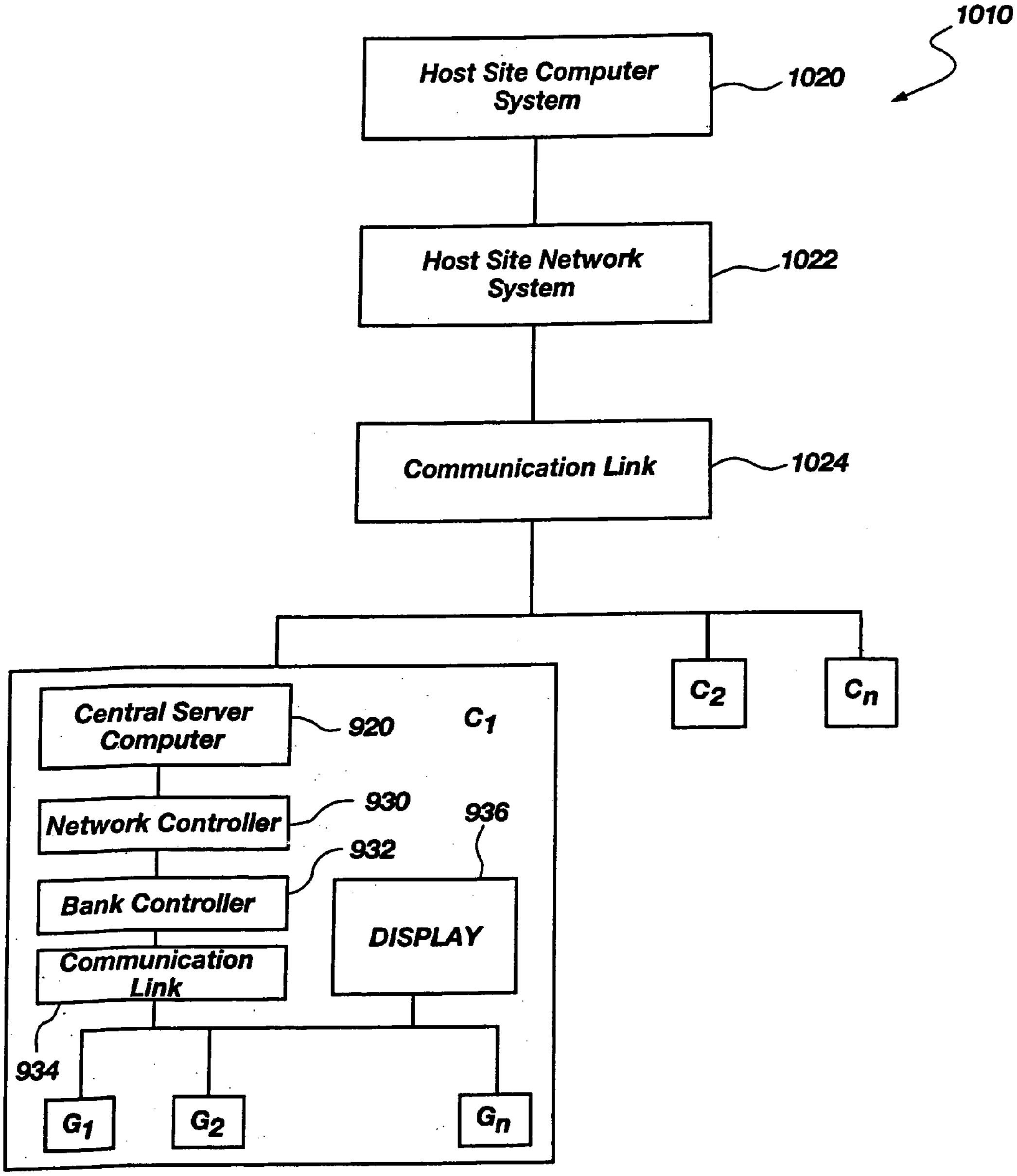
FIG. 16 is a schematic of a plurality of networked gaming devices incorporated in a multi-site gaming system.

As previously implied, a bank of gaming machines $G_1$, $G_2$ . . . $G_n$ may be networked together in a progressive configuration, as known in the art, wherein a portion of each wager to initiate a primary game may be allocated to bonus event awards. In addition, and referring to FIG. 16, a host site computer 1020 is operably coupled to a plurality of the central server computers 920 at a variety of remote casino or other gaming sites $C_1$ $C_2$ . . . $C_n$ for providing a multi-site linked progressive automated bonus gaming system 1010.

The host site computer 1020 may be maintained for the overall operation and control of the automated bonus gaming system 1010. The host site computer 1020 includes a computer network 1022 and a communication link 1024 provided with a high-speed, secure modem for each individual casino site $C_1$ $C_2$ . . . $C_n$.

Each casino site $C_1$ $C_2$ . . . $C_n$ includes a central server computer 920 provided with a network controller 930 which includes a high-speed modem operably coupled thereto. Bidirectional communication between the host site computer 1020 and each casino site central server computer 920 is accomplished by the set of modems transferring data over dedicated communication link 1024.

A network controller 930, a bank controller 932 and a communication link 934 are interposed between each central server 920 and the plurality of attached gaming machines $G_1$, $G_2$ . . . $G_n$ at each casino site $C_1$ $C_2$ . . . $C_n$. In addition, the network controller 930, the bank controller 932 and the communication link 934 are interposed between each central server 920 and a separate display 936, if employed, at each casino site $C_n$. However, the system 1010 may include means to loop-back data for in-machine meter displays to communicate with bonus award insert areas on gaming machines $G_1$, $G_2$ . . . $G_n$.

Figure 17:
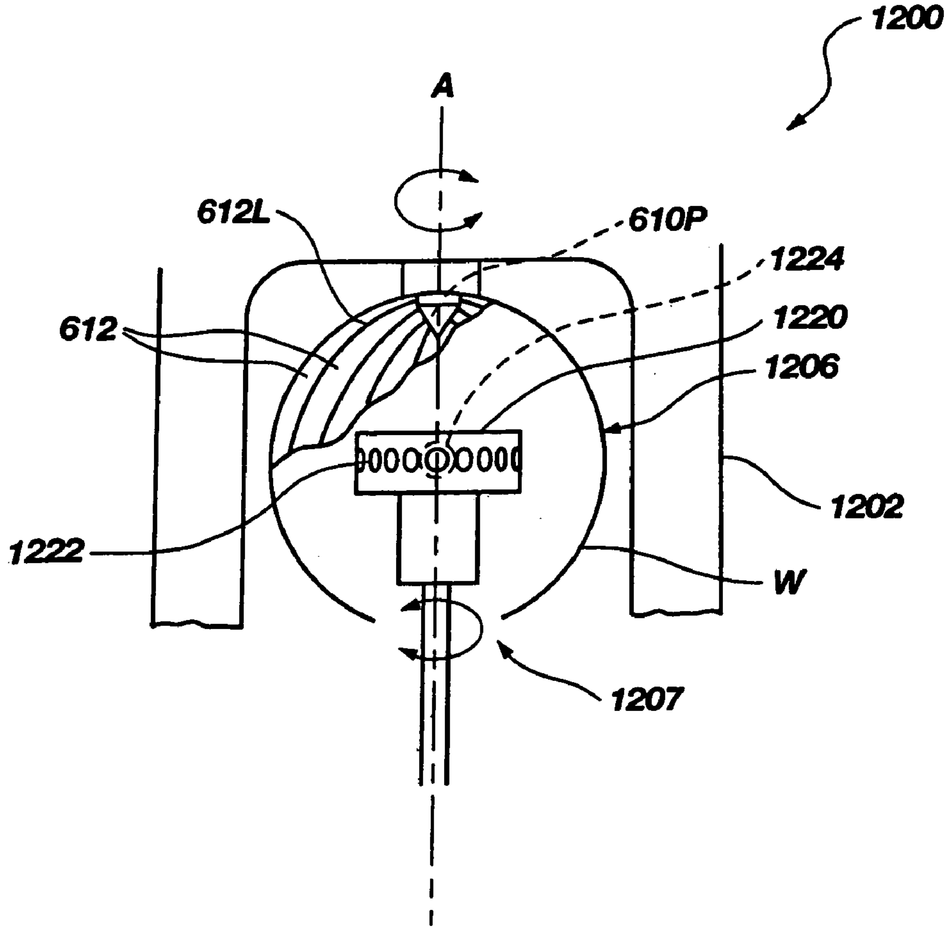
FIG. 17 is an exemplary implementation of a further embodiment of an outcome display element assembly suitable for use with the present invention and which may be implemented as perceptibly rotatable as well as physically rotatable.

FIG. 17 depicts a further embodiment of an outcome display element assembly 1200 and associated components, elements and features, which assembly provides a visually perceptible representation of rotation of an outcome display element. In fact, no actual physical rotation of outcome display element 1206, shown configured as a sphere, may be employed or, as hereinafter discussed, outcome display element 1206 may be made rotatable for enhanced visual effect. Outcome display element 1206 is hollow, includes an opening 1207 in the bottom thereof, and may be configured as a sphere (shown), a diamond, an ovoid or other suitable shape. Outcome display element 1206 is suspended from above by a portion of a housing 1202 extending thereover in arch-like fashion. The wall W of the sphere is translucent, so as to enable the interior thereof to function as a projection screen. As shown, projector 1220 is mounted for rotation about an axis substantially coincident with a longitudinal axis A, and in the illustrated case a diameter, of outcome display element 1206. Projector 1220 extends upwardly into outcome display element 1206, and includes a plurality of lenses 1222, each of which has associated therewith a slide element (not shown) as known in the still image projection art, each slide element comprising a transparency of a bonus indicia or symbol to be projected onto the interior of outcome display element 1206. A high-intensity lighting element 1224 on the interior of projector 1220 emits light through the lenses 1222, causing the bonus symbols on the slide elements to be projected in a focused manner on the interior of outcome display element 1206 so as to be visible from the exterior thereof. Rotation of projector 1220, which may be effected by a stepper motor and driver assembly as described above with respect to the embodiments of FIGS. 8A through 13B, causes the projected bonus indicia or symbols to perceptibly rotate, simulating the rotation of outcome display element 1206. An outcome indicator element 610*p*, shown in FIG. 17 as a pointer-type element, may be employed to designate the location of the bonus indicia or symbol representing a value of the bonus award, as in the embodiments of FIGS. 8A through 13B. To further enhance the clarity of separation between mutually circumferentially adjacent projected bonus indicia or symbols, outcome display element 1206 may have sectors 612 identified thereon as in prior embodiments, the sectors 612 divided by dark or even opaque lines 612L therebetween. To further enhance the effect of the visual display, it is also contemplated that outcome display element 1206 may be rotated about axis A in the same direction, or opposite direction, to projector 1220 and simultaneously therewith. Either outcome display element 1206, projector 1220, or both, may be caused to gradually slow in rate of rotation as described above with respect to other embodiments. Further, the relative orientations and mounting points for outcome display element 1206 and projector 1220 may be reversed, so that projector 1220 is suspended downwardly from housing 1202 into outcome display element 1206.

While the outcome indicator elements of the present invention have been described in exemplary fashion and with respect to specific exemplary implementations, those of ordinary skill in the art will understand that any suitable outcome indicator element may be employed. For example, an arrow image maybe projected onto or adjacent the surface of the outcome display element sector exhibiting the value of the bonus award for a game. The outcome indicator element may be configured as a pointer and counter-rotated with respect to the outcome display element about the same axis. Multiple, circumferentially separated pointers may be used, and the pointer coming to rest at a selected circumferential point used to identify the bonus award. In such a manner, different values may be associated with different pointers so that the pointers (or other outcome in indicator elements) may be used as payout multipliers for the bonus award, for the primary game outcome, or both, as desired. The outcome indicator element may further be configured as a frame or partial frame, showing a bonus value of a selected sector within the boundary thereof.

It will also be understood and appreciated that the outcome display elements of the present invention may be driven as previously described by way of example, or in any other suitable manner providing adequate control and precision of the final rotational position thereof. For example, an outcome display element in the form of a sphere may be made of, or coated with, a ferromagnetic material or have discrete magnets placed inside, suspended in mid-air using air pressure or supported by low-friction bearings, and rotated through a magnetic coupling driven (as an example) by a stepper motor and driver assembly. Similarly, the outcome display element may be magnetically suspended from a housing through a magnetic coupling, as well as rotated thereby. Further, the outcome display element may be rotated through use of a gear extending about the axis of rotation and on the exterior of the outcome display element proximate the upper or lower extent thereof (with respect to the length of the axis of rotation), the gear being engaged by another, cooperative gear or toothed drive belt driven by a motor, the area of engagement being hidden by a decorative envelope configured, for example and with respect to the embodiment of FIGS. 8A–8C, the base of a crystal ball.

While the present invention has been disclosed with reference to certain illustrated embodiments, those of ordinary skill in the art will understand and appreciate that it is not so limited. Many additions and modifications to, and deletions from, the embodiments disclosed herein may be made without departing from the scope of the invention. Similarly, features and elements from one embodiment may be combined freely with features and elements of other embodiments, the scope of the invention being limited only by the claims which follow herein.

What is claimed is:

1. A slot machine, comprising:

a housing;

a value-input device supported by said housing;

a first slot machine reel disposed in said housing, said first slot machine reel having a plurality of first reel symbols disposed thereon;

a second slot machine reel disposed in said housing, said second slot machine reel having a plurality of second reel symbols disposed thereon;

a third slot machine reel disposed in said housing, said third slot machine reel having a plurality of third reel symbols disposed thereon;

a mechanical payout indicator supported by said housing, said mechanical payout indicator comprising a rotatable payout indicator having a spherical shape, said rotatable payout indicator being rotatable about an axis that passes through said rotatable payout indicator, said rotatable payout indicator comprising a plurality of payout regions including a first payout region, a second payout region, and a third payout region, each of said payout regions comprising a curved, non-planar surface;

a plurality of payout symbols disposed on said rotatable payout indicator in said payout regions, said payout symbols including a first payout symbol comprising a numeral disposed in said first payout region, a second payout symbol comprising a numeral disposed in said second payout region, and a third payout symbol comprising a numeral disposed in said third payout region; and a fixed outcome indicator element associated with said rotatable payout indicator, said outcome indicator element visibly indicating one of said first, second or third payout regions after said rotatable payout indicator comes to a final stop, with the other of the first, second or third payout regions also being visible after said rotatable payout indicator comes to a final stop.

2. A slot machine as defined in claim 1 wherein the payout indicator includes fourth and fifth payout regions, the fourth and fifth payout regions also being visible when the one of said first, second or third payout regions is indicated.

3. A slot machine as defined in claim 2 wherein the first, second, third, fourth, and fifth payout regions are adjacent.

4. A slot machine as defined in claim 1 additionally comprising an at least substantially hemispherical, transparent window disposed over the spherical payout indicator.

5. A slot machine as defined in claim 4 wherein the outcome indicator element is disposed inside the at least substantially hemispherical transparent window.

6. A slot machine as defined in claim 4 wherein substantially all of the plurality of payout regions are visible through the at least substantially hemispherical, transparent window after said payout indicator comes to a final stop.

7. A slot machine as defined in claim 1 wherein said outcome indicator element comprises a pointer.

8. A slot machine as defined in claim 1 wherein one of said payout symbols comprises a first multi-digit numeral, wherein another of said payout symbols comprises a second multi-digit numeral, and wherein said first multi-digit numeral has a different number of digits than said second multi-digit numeral.

9. A slot machine, comprising:

a housing;

a value-input device supported by said housing;

a first slot machine reel disposed in said housing, said first slot machine reel having a plurality of first reel symbols disposed thereon;

a second slot machine reel disposed in said housing, said second slot machine reel having a plurality of second reel symbols disposed thereon;

a third slot machine reel disposed in said housing, said third slot machine reel having a plurality of third reel symbols disposed thereon;

a mechanical payout indicator supported by said housing, said mechanical payout indicator comprising a rotatable payout indicator having a spherical shape, said rotatable payout indicator being rotatable about an axis that passes through said rotatable payout indicator, said axis being a substantially upright axis, said rotatable payout indicator comprising a plurality of payout regions including a first payout region, a second payout region, and a third payout region, each of said payout regions comprising a curved, non-planar surface;

a plurality of payout symbols disposed on said rotatable payout indicator in said payout regions, said payout symbols including a first payout symbol comprising a numeral disposed in said first payout region, a second payout symbol comprising a numeral disposed in said second payout region, and a third payout symbol comprising a numeral disposed in said third payout region; and a fixed outcome indicator element associated with said rotatable payout indicator, said outcome indicator element visibly indicating one of said first, second or third payout symbols after said rotatable payout indicator comes to a final stop after being gradually slowed in its rate of rotation, with the other of the first, second or third payout regions also being visible after said rotatable payout indicator comes to a final stop.

10. A slot machine, comprising:

a housing;

a value-input device supported by said housing;

a first slot machine reel disposed in said housing, said first slot machine reel having a plurality of first reel symbols disposed thereon;

a second slot machine reel disposed in said housing, said second slot machine reel having a plurality of second reel symbols disposed thereon;

a third slot machine reel disposed in said housing, said third slot machine reel having a plurality of third reel symbols disposed thereon;

a mechanical payout indicator supported by said housing, said mechanical payout indicator comprising a rotatable payout indicator having a spherical shape, said rotatable payout indicator being rotatable about an axis that passes through said rotatable payout indicator, said axis being a substantially upright axis, said rotatable payout indicator comprising a plurality of payout regions including a first payout region, a second payout region, and a third payout region, each of said payout regions comprising a curved, non-planar surface;

a plurality of payout symbols disposed on said rotatable payout indicator in said payout regions, said payout symbols including a first payout symbol comprising a numeral disposed in said first payout region, a second payout symbol comprising a numeral disposed in said second payout region, and a third payout symbol comprising a numeral disposed in said third payout region; and a fixed outcome indicator element associated with said rotatable payout indicator, said outcome indicator element visibly indicating one of said first, second or third payout symbols after said rotatable payout indicator comes to a final stop with the other of the first, second or third payout regions also being visible after said rotatable payout indicator comes to a final stop.

11. A slot machine, comprising:

a housing;

a value-input device supported by said housing;

a display apparatus supported by said housing, said display apparatus displaying a plurality of first reel symbols, a plurality of second reel symbols, and a plurality of third reel symbols;

a mechanical payout indicator supported by said housing, said mechanical payout indicator comprising a rotatable payout indicator having a spherical shape, said rotatable payout indicator being rotatable about an axis that passes through said rotatable payout indicator, said rotatable payout indicator comprising a plurality of payout regions including a first payout region, a second payout region, and a third payout region, each of said payout regions comprising a curved, non-planar surface;

a plurality of payout symbols disposed on said rotatable payout indicator in said payout regions, said payout symbols including a first payout symbol comprising a numeral disposed in said first payout region, a second payout symbol comprising a numeral disposed in said second payout region, and a third payout symbol comprising a numeral disposed in said third payout region; and a fixed outcome indicator element associated with said rotatable payout indicator, said outcome indicator element visibly indicating one of said first, second and third payout symbols after said rotatable payout indicator comes to a final stop with the other of the first, second or third payout regions also being visible after said rotatable payout indicator comes to a final stop.

12. A slot machine as defined in claim 11 wherein the payout indicator includes fourth and fifth payout regions, the fourth and fifth payout regions also being visible when the one of said first, second or third payout regions is indicated.

13. A slot machine as defined in claim 12 wherein the first, second, third, fourth, and fifth payout regions are adjacent.

14. A slot machine as defined in claim 11 additionally comprising an at least substantially hemispherical, transparent window disposed over the spherical payout indicator.

15. A slot machine as defined in claim 14 wherein the outcome indicator element is disposed inside the at least substantially hemispherical transparent window.

16. A slot machine as defined in claim 14 wherein substantially all of the plurality of payout regions are visible through the at least substantially hemispherical, transparent window after said payout indicator comes to a final stop.

17. A slot machine as defined in claim 11 wherein said outcome indicator element comprises a pointer.

18. A slot machine as defined in claim 11 wherein one of said payout symbols comprises a first multi-digit numeral, wherein another of said payout symbols comprises a second multi-digit numeral, and wherein said first multi-digit numeral has a different number of digits than said second multi-digit numeral.

19. A slot machine as defined in claim 11 wherein said display apparatus comprises a video display unit.

20. A slot machine as defined in claim 11 wherein said display apparatus comprises a plurality of slot machine reels, at least one of said slot machine reels having a plurality of reel symbols disposed thereon.

* * * * *